(12) United States Patent
Nagaoka

(10) Patent No.: US 9,751,486 B2
(45) Date of Patent: Sep. 5, 2017

(54) HOLLOW WEAVE FABRIC FOR AN AIR BAG AND METHOD OF PRODUCING THE SAME

(71) Applicant: ASAHI KASEI CHEMICALS CORPORATION, Chiyoda-Ku, Tokyo (JP)

(72) Inventor: Toshihiro Nagaoka, Hyogo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/245,073

(22) Filed: Apr. 4, 2014

(65) Prior Publication Data

US 2014/0220245 A1 Aug. 7, 2014

Related U.S. Application Data

(62) Division of application No. 11/631,931, filed as application No. PCT/JP2005/013049 on Jul. 14, 2005, now abandoned.

(30) Foreign Application Priority Data

Jul. 16, 2004 (JP) ................................ 2004-210393

(51) Int. Cl.
  *B60R 21/16* (2006.01)
  *B60R 21/235* (2006.01)
  (Continued)

(52) U.S. Cl.
  CPC ............ *B60R 21/16* (2013.01); *B60R 21/235* (2013.01); *D03D 1/02* (2013.01); *D06M 15/643* (2013.01);
  (Continued)

(58) Field of Classification Search
  CPC B60R 2021/23509; B60R 2021/23547; B60R 21/16; B60R 21/235; D03D 1/02
  (Continued)

(56) References Cited

U.S. PATENT DOCUMENTS 5,258,211 A 11/1993 Momii et al.
5,733,605 A * 3/1998 Akiyama et al. ............. 427/356
(Continued)

FOREIGN PATENT DOCUMENTS

JP 4-193646 7/1992
JP 5-202338 8/1993
(Continued)

OTHER PUBLICATIONS

DuPont, Nylon 6,6 the First Choice for Airbag Fiber, Feb. 21, 2003.
(Continued)

*Primary Examiner* — Alexander Weddle
(74) *Attorney, Agent, or Firm* — Staas & Halsey LLP

(57) ABSTRACT

A hollow weave fabric for an air bag in which the periphery of a double-layer hollow weave portion is formed with a seam zone, wherein the warp yarn and the weft yarn forming the base fabric are each a poly(hexamethylene adipamide) fiber having a total size of 150 to 500 dtex, the double-layer hollow weave portion has a fabric weight of 120 to 350 g/m² on one side, and the fabric shows a logarithmic decrement of 0.01 to 0.10.

2 Claims, 3 Drawing Sheets

(51) Int. Cl.
*D03D 1/02* (2006.01)
*D06M 15/643* (2006.01)
*D06N 3/00* (2006.01)
*D06N 3/12* (2006.01)

(52) U.S. Cl.
CPC .......... *D06N 3/0002* (2013.01); *D06N 3/128* (2013.01); *B60R 2021/23509* (2013.01); *B60R 2021/23547* (2013.01)

(58) Field of Classification Search
USPC .................................................... 427/209
See application file for complete search history.

(56) References Cited

U.S. PATENT DOCUMENTS

| | | | | |
|---|---|---|---|---|
| 5,763,330 | A * | 6/1998 | Bertolucci et al. | 442/65 |
| 6,200,915 | B1 | 3/2001 | Adams et al. | |
| 6,562,737 | B1 | 5/2003 | Bohin et al. | |
| 6,759,355 | B2 * | 7/2004 | Nagaoka | B60R 21/235 106/2 |
| 2002/0145276 | A1 * | 10/2002 | Veiga | B32B 27/04 280/743.1 |
| 2003/0060104 | A1 * | 3/2003 | Veiga | D06N 3/183 442/76 |
| 2003/0124929 | A1 | 7/2003 | Hurst et al. | |
| 2003/0211340 | A1 | 11/2003 | Ikeno et al. | |
| 2004/0077236 | A1 * | 4/2004 | Ishii et al. | 442/76 |
| 2004/0256842 | A1 * | 12/2004 | Breed | B32B 5/26 280/730.1 |
| 2007/0007756 | A1 * | 1/2007 | Okuno et al. | 280/743.1 |

FOREIGN PATENT DOCUMENTS

| | | |
|---|---|---|
| JP | 7-300774 | 11/1995 |
| JP | 11-1876 | 1/1999 |
| JP | 11-350361 | 12/1999 |
| JP | 2000-169590 | 6/2000 |
| JP | 2003-510469 | 3/2003 |
| JP | 2003-526557 | 9/2003 |
| JP | 2003-278083 | 10/2003 |
| JP | 2004-149992 | 5/2004 |
| WO | 03/078711 | 9/2003 |
| WO | 2004/042128 | 5/2004 |
| WO | 2005/031052 | 4/2005 |
| WO | WO 2005031052 A1 * | 4/2005 |

OTHER PUBLICATIONS

International Search Report of the International Application PCT/JP2005/013049, mailed Nov. 1, 2005.
European Search Report dated Aug. 6, 2009 and issued in corresponding European Patent Application 05765788.4.
U.S. Office Action for U.S. Appl. No. 11/631,931, issued on Oct. 7, 2009, 7 pages.
U.S. Office Action for U.S. Appl. No. 11/631,931, issued on Dec. 23, 2009, 6 pages.
U.S. Office Action for U.S. Appl. No. 11/631,931, issued on Jul. 7, 2010, 8 pages.
U.S. Office Action for U.S. Appl. No. 11/631,931, issued on Feb. 25, 2013, 19 pages.
U.S. Office Action for U.S. Appl. No. 11/631,931, issued on Nov. 4, 2013, 13 pages.

* cited by examiner

A ⟶ B

HOLLOW WEAVE FABRIC FOR AN AIR BAG AND METHOD OF PRODUCING THE SAME

CROSS REFERENCE TO RELATED APPLICATIONS

This application is a divisional of U.S. patent application Ser. No. 11/631,931, filed on Jan. 9, 2007, which was based on PCT Application No. PCT/JP2005/013049 filed Jul. 14, 2005 and Japanese Application No. 2004-210393 filed Jul. 16, 2004, the disclosures of which are hereby incorporated herein by reference.

FIELD OF THE INVENTION

The present invention relates to a base fabric used for an air bag that is one of the safety devices of vehicles such as automobiles. In particular, the present invention relates to a hollow weave fabric for an air bag for protecting an occupant of a vehicle during collision, and a method of producing the same.

BACKGROUND ART

Improvement of the safety of occupants in vehicles such as automobiles has been required in recent years, and the installation ratio of air bags has been improved. An air bag is a module wherein a sensor detects the impact a vehicle encounters during a head-on collision, a rear-end collision or a side collision of the vehicle, a gas is then blown into an expandable bag portion from an inflator to rapidly deploy and expand the air bag, and the cushioning of the air bag protects the occupant.

Conventional air bags are often installed in the front portion of a driver's seat and an assistant driver's seat, respectively, and are often installed to protect the faces and the upper half parts of the bodies of occupants principally during a head-on collision. A curtain-like air bag capable of corresponding to a side collision and a sideway rolling (hereinafter referred to as rollover) has recently been developed.

The curtain-like air bag is stored in, for example, a region from the front pillar side to the rear pillar side along the roof rail of the sidewall within an automobile, and designed to be expanded and deployed along the side windows during a collision. Moreover, for the curtain-like air bag, an expandable bag-like portion is formed at each of the plurality of sites, and the air bag is long and large and has a complicated shape. The curtain-like air bag is required to be excellent in storability (compactness). Furthermore, because the distance between the head portion of an occupant and the side glass window is short, the air bag must instantaneously enter between the occupant's head portion and the window glass to protect the head portion during a side collision. That is, the air bag is required to have a rapid deployment speed. Furthermore, correspondence of the air bag to a rollover accident in which the automobile side rolls several times is taken into consideration, and it is required that the internal pressure of the air bag not lower too much for a certain period. That is, the air bag is required to retain the internal pressure of 40 kPa or more for about 8 sec after expansion and deployment.

Furthermore, the internal pressure retention performance of the air bag is originally expected to function even after the air bag is exposed to a variety of environments. However, the air bag has actually not displayed the internal pressure retaining function under severe environmental test conditions such as heat aging, wet heat aging and cooling-heating cycle aging.

When the coating film thickness is increased in order to enhance the internal pressure retention performance, the air bag weight is undesirably increased. Moreover, the air bag cannot pass a severe environment test. In order to further increase the deployment speed, the woven fabric forming the base fabric must be made light weight.

There is one type of curtain-like air bag that is prepared by cutting a plurality of cloths, and sewing the cut cloths. In order to prevent air leakage caused by a sewing needle, the seams of the air bag are filled with a sealing agent, and the sites are sewn with a thick sewing thread for the purpose of ensuring burst resistance. As a result, the air bag has the following problems: the air bag has poor storability; and sewing the air bag takes a lot of time.

Japanese Unexamined Patent Publication (Kokai) No. 3-16852 discloses preparation of a bag-like high density woven fabric in which the periphery of the hollow weave portion is closed with a single-layer portion, and use of it as an air bag. However, such a woven fabric is formed out of a synthetic warp yarn and a synthetic weft yarn each having a total size of 500 dtex or more. It has a large amount of coating for the purpose of preventing air leakage, and a fabric weight of 700 g/m². The air bag does therefore not sufficiently satisfy the requirement of light weight.

Japanese Unexamined Patent Publication (Kokai) No. 11-1876 discloses a fiber woven fabric having two coating layers. The first layer is formed by coating with a high elongation silicone, and the second layer is formed by coating with a high tear strength silicone. When the base fabric is coated with a high elongation silicone as the first layer, the air bag before aging shows good internal pressure retention. However, the high elongation silicone has poor adhesion to the woven fabric and the following problems result: the internal pressure retention after aging deteriorates after wet heat aging and cooling-heating cycle aging; and delamination of the silicone film sometimes takes place.

Japanese Patent Publication No. 2003-526557 discloses a technology of coating with a mixture of a silicone compound and a non-silicone compound as a first layer and a silicone compound as a second layer. The patent publication describes that the coating amount can be made small according to the technology, and that the internal pressure retention of the air bag can be maintained even after heat aging and wet heat aging. However, in conventional air bags, the adhesive strength of the first coating layer significantly lowers in the cooling region during cooling-heating cycle aging, and the air bag cannot withstand the initial pressure during expansion and deployment; as a result, the air bag cannot maintain the internal pressure retaining function.

Japanese Unexamined Patent Publication (Kokai) No. 2003-327910 discloses a silicone composition the silicone coating layer of which is not delaminated during deployment of an air bag and is excellent in internal pressure retention. However, there is no disclosure in the above patent specification regarding internal pressure retention during air bag deployment after aging.

DISCLOSURE OF THE INVENTION

Problems to be Solved by the Invention

In view of the conventional technologies as explained above, an object of the present invention is to provide a hollow weave fabric for an air bag excellent in internal pressure retention during air bag deployment after wet heat aging and cooling-heating cycle aging, and to provide a hollow weave fabric suitable for a curtain-like air bag that is made light weight.

Means for Solving the Problems

As a result of extensive investigations, the present inventors have found that the above problems can be solved by specifying the total size of a warp yarn and that of a weft yarn forming the base fabric in a hollow weave fabric for an air bag in which the periphery of the double-layer hollow weave portion is formed with a seam zone, and employing a coating composition showing a high logarithmic decrement. According to the present invention, a curtain-like air bag excellent in internal pressure retention before and after aging in comparison with conventional ones, and being made light weight can be obtained.

The present invention is as explained below.

1) A hollow weave fabric for an air bag in which the periphery of a double-layer hollow weave portion is formed with a seam zone, wherein the warp yarn and the weft yarn forming the base fabric are each a poly(hexamethylene adipamide) fiber having a total size of 150 to 500 dtex, the double-layer hollow weave portion has a fabric weight of 120 to 350 g/m² on one side, and the fabric shows a logarithmic decrement of 0.01 to 0.10.

2) The hollow weave fabric for an air bag according to 1 described above, wherein the double-layer hollow weave portion has a coating layer of a silicone composition.

3) The hollow weave fabric for an air bag according to 2 describes above, wherein the silicone composition contains an organopolysiloxane containing a SiC-bonded vinyl group at a terminal end and having a viscosity of 1,000 to 1,000,000 mPa·s at 25° C.

4) The hollow weave fabric for an air bag according to 3 described above, wherein the double-layer hollow weave portion has at least two coating layers each formed of a silicone composition, and the following conditions (1) and (2) are satisfied:

(1) a first layer is a coating on the surface of the woven fabric, and the coating amount of the silicone composition is from 3 to 30 g/m² as a solid component; and (2) a second layer is formed on the surface of the first layer, and the coating amount of the silicone composition is from 20 to 90 g/m² as a solid component.

5) The hollow weave fabric for an air bag according to 4 described above, wherein the first silicone coating layer is formed of a silicone composition containing 0.1 to 4.5% by weight of a coupling agent comprising an organosilicon compound.

6) The hollow weave fabric for an air bag according to 4 or 5 described above, wherein the tensile elongation of the silicone composition after curing in the first silicone coating layer is 350% or less.

7) The hollow weave fabric for an air bag according to any of 4 to 6 described above, wherein the first silicone coating layer is formed of a silicone composition containing an organopolysiloxane that contains a SiC-bonded vinyl group at a terminal end and that has a viscosity of 1,000 to 100,000 mPa·s at 25° C.

8) The hollow weave fabric for an air bag according to any of 4 to 7 described above, wherein the second silicone coating layer is formed of a silicone composition containing an organopolysiloxane that contains a SiC-bonded vinyl group at a terminal end and that has a viscosity of 50,000 to 1,000,000 mPa·s at 25° C.

9) The hollow weave fabric for an air bag according to any of 4 to 8 described above, wherein the coating amount of the silicone composition in the second silicone coating layer is from 30 to 60 g/m².

10) The hollow weave fabric for an air bag according to any of 4 to 9 described above, wherein the tensile elongation of the silicone composition after curing in the second silicone coating layer is 400% or more.

11) The hollow weave fabric for an air bag according to any of conditions 2 to 10 described above, wherein the phase image in the tapping measurement with an SPM at a cross section of the silicone coating layer is at least two layers with respect to the woven fabric surface.

12) The hollow weave fabric for an air bag according to condition 11 described above, wherein the average phase δ in the tapping measurement with an SPM at a cross section of each layer in the first silicone coating layer and the second one from the woven fabric surface is as follows: (δ of first layer)>(δ of second layer).

13) The hollow weave fabric for an air bag according to condition 11 or 12 described above, wherein the ratio of an average phase δ of the first silicone coating layer from the woven fabric to an average phase δ of the second one therefrom, in the tapping measurements with an SPM at a cross section of each layer, is from 1.1 to 2.5.

14) The hollow weave fabric for an air bag according to condition 11 described above, wherein the ratio of an average film thickness D of the first silicone coating layer from the woven fabric surface to an average film thickness D of the second one therefrom is as follows: $1/30<[(D$ of first layer)/(D of second layer)]$<1$.

15) The hollow weave fabric for an air bag according to any of conditions 1 to 14 described above, wherein the fabric has a layer as a third layer formed by coating the surface of the second silicone coating layer with a silicone composition containing 30% by weight or more of an inorganic filler in an amount of 1 to 25 g/m² as a solid component.

16) The hollow weave fabric for an air bag according to any of conditions 1 to 15 described above, wherein the fabric is capable of being subjected to a scrub test at least 500 times after wet heat aging and cooling-heating cycle aging.

17) A curtain-like air bag formed out of the hollow weave fabric for an air bag according to any of conditions 1 to 16 described above, and capable of retaining a gas under pressure for a given time.

18) A method of producing a hollow weave fabric for an air bag composed of a poly(hexamethylene adipamide) fiber of 150 to 500 dtex, and showing a logarithmic decrement of 0.01 to 0.10 at 20° C., the method comprising the steps of applying the following silicone compositions (1) and (2) as a first coating layer and a second one, respectively:

(1) the silicone composition for the first coating layer with which the woven fabric surface is coated contains at least the following (a) to (d), and the silicone composition forming the silicone coating layer shows a tensile elongation of 350% or less after curing:

(a) an organopolysiloxane containing a SiC-bonded vinyl group at a terminal unit and having a viscosity of 1,000 to 100,000 mPa·s at 25° C.;

(b) an organopolysiloxane containing at least 3 Si-bonded hydrogen atoms;

(c) a catalyst for promoting addition of a Si-bonded hydrogen atom to aliphatic multiple bonds; and (d) a coupling agent composed of an organosilicon compound;

(2) the silicone composition for the second coating layer with which the first coating layer surface is coated contains at least the following elements (A) to (C), and the silicone composition forming the silicone coating layer shows a tensile elongation of 400% or more after curing:

(A) an organopolysiloxane containing a SiC-bonded vinyl group at a terminal unit and having a viscosity of 50,000 to 1,000,000 mPa·s at 25° C.;

(B) an organopolysiloxane containing at least 3 Si-bonded hydrogen atoms; and (C) a catalyst for promoting addition of a Si-bonded hydrogen atom to aliphatic multiple bonds.

19) The method of producing a hollow weave fabric for an air bag according to condition 18 described above, wherein the weave density of the double-layer weave portion of the hollow weave fabric is from 40 to 100/2.54 cm.

20) The method of producing a hollow weave fabric for an air bag according to condition 18 or 19 described above, wherein the silicone composition contains from 0.1 to 4.5% by weight of a coupling agent.

21) The method of producing a hollow weave fabric for an air bag according to any of conditions 18 to 20 described above, wherein the silicone composition is applied, as the first silicone coating layer, in an amount of 3 to 30 g/m$^2$ as a solid component by a floating knife, a roll-on-knife, gravure coating or dipping, and the applied silicone composition is heat treated at 120 to 200° C. for 10 to 600 sec.

22) The method of producing a hollow weave fabric for an air bag according to any of conditions 18 to 21 described above, wherein the silicone composition is applied, as the second silicone coating layer, in an amount of 20 to 90 g/m$^2$ as a solid component by a floating knife, a roll-on-knife or a comma coater, and the applied silicone composition is heat treated at 120 to 200° C. for 10 to 600 sec.

23) The method of producing a hollow weave fabric for an air bag according to any of conditions 18 to 22 described above, wherein the surface of the second silicone coating layer is coated, as a third layer, with a silicone composition containing 30% by weight or more of an inorganic filler, in an amount of 1 to 20 g/m$^2$ as a solid component.

24) The method of producing a hollow weave fabric for an air bag according to condition 20 described above, wherein the silicone composition contains 0.1 to 3% by weight of a coupling agent.

25) The method of producing a hollow weave fabric for an air bag according to condition 22 described above, wherein the silicone composition is applied, as the second silicone coating layer, in an amount of 30 to 60 g/m$^2$ as a solid component.

The present invention will now be explained in detail below.

A poly(hexamethylene adipamide) (hereinafter merely referred to as nylon 66) fiber or a fiber mainly containing poly(hexamethylene adipamide) is preferably used as a warp yarn and a weft yarn that form the hollow weave fabric for an air bag of the invention. In particular, in view of heat resistance, a nylon 66 fiber, a nylon 66 copolymer (such as nylon 66/6, nylon 66/61 and nylon 66/610) fiber and a nylon 66 fiber in which a nylon polymer such as a nylon 6 or a nylon 610 is blended, having a melting point of 215° C. or more is preferred.

In the present invention, a nylon 66 fiber can be produced by a known spinning and drawing method or a known spinning and direct drawing method.

In order to improve the processability of such fiber yarns in the raw yarn production step and after-processing step, the fiber yarns may be made to contain various additives. For example, one or at least two materials selected from heat stabilizers, light stabilizers, aging retarders, antioxidants, lubricants, smooth finishing agents, pigments, water-repellents, oil-repellents, masking agents such as titanium oxide, lustering agents, fire retardants, plasticizers, antistatic agents, thickeners, and the like. Moreover, if necessary, the yarns can be texturized forms such as twisted yarns, bulked yarns, crimped yarns and wound yarns.

Furthermore, in order to improve the cohesiveness and drawability of the fiber during spinning, a known finishing agent for spinning may be applied to the fiber in an amount of 0.1 to 5% by weight.

The total size of a warp yarn and a weft yarn forming the hollow weave fabric for an air bag must be from 150 to 500 dtex, preferably from 150 to 350 dtex. When the total size is in the above range, the hollow weave fabric can withstand the tenacity during deployment inflation. The base fabric becomes flexible at the same time to improve the storability of the air bag, and the air bag can be deployed at high speed. When a warp yarn and a weft yarn each having a total size in the above range are used, the fabric weight in the hollow weave portion becomes from 90 to 280 g/m$^2$.

When the total size is less than 150 dtex, the mechanical strength of the air bag becomes insufficient during deployment, and a burst phenomenon sometimes takes place. Moreover, when the total size exceeds 500 dtex, the thickness of the base fabric increases, and the storability of the air bag becomes poor due to a decrease in the foldability thereof. Furthermore, because the base fabric weight increases, the deployment speed becomes slow.

Furthermore, the single filament size of a warp yarn and a weft yarn is from 0.1 to 7 dtex, preferably from 0.5 to 5.0 dtex. There is no specific limitation on the single filament cross-sectional shape of a warp yarn and a weft yarn. For example, a round shape or a shape-modified cross section such as a triangular shape or a flat shape is employed. In order to for the yarns to have maximum strength, a round shape cross section is preferred.

Furthermore, the tensile strength of a yarn forming the base fabric is preferably 5.7 cN/dtex or more, more preferably 6.2 cN/dtex or more. When the tensile strength is 5.7 cN/dtex or more, the air bag thus obtained can satisfy the pressure resistance tenacity required during deployment. A particularly preferred tensile strength is from 6.2 to 11 cN/dtex.

For the woven fabric used for the hollow weave fabric for an air bag of the present invention, the upper cloth and the lower cloth of the double-layer hollow weave portion that is expanded when a fluid is introduced thereinto are preferably formed out of a plain structure. The fabric weight of one side of the double-layer hollow weave portion is from 120 to 350 g/m$^2$. Moreover, it is further preferred that the periphery of the double-layer hollow weave portion be formed out of a seam zone that is formed out of a reversible figured weave and a basket weave pattern. The base unit of the basket weave pattern is formed out of warp yarns and weft yarns crossing each other in the sinking/floating direction. The basket weave pattern is a structure in which the base unit is repeated both in the longitudinal and lateral directions. The basket weave pattern is sometimes referred to as a mat structure, a basket structure, or the like structure.

In the present invention, the logarithmic decrement is a value measured with a rigid pendulum type physical property tester (trade name of RPT-3000, manufactured by A and D Co., Ltd.). In order for a light weight coating resin of the air bag to absorb the impact during deployment of the air bag, the logarithmic decrement of the coated fabric at 20° C.

must be from 0.01 to 0.10, preferably from 0.02 to 0.06. When the logarithmic decrement is less than 0.01, the resin shows no impact absorption, and air leakage may take place during deployment of the air bag. Moreover, when the logarithmic decrement of the resin is larger than 0.10, the air bag has too soft a surface, and tucking properties are produced. As a result, the operationability of folding the air bag becomes poor, and the deployment of the air bag also becomes poor.

In the present evaluation, a blade is first placed on a sample surface, and the blade sinks due to its weight. As a result, both sides of the blade are in contact with the sample. The blade is then vibrated as a pendulum. The blade presses the vibration amplitude of the sample back on the surface of the blade contacted with the sample. The behavior of the blade produces a free decrement. In the present evaluation, the manner of a free decrement is measured.

In the present evaluation, for a sample that is softer and that as a result shows a larger energy loss when deformed, a higher decrement is measured. Accordingly, measurements of the coating surface of an air bag base fabric sample can express the degree of energy loss caused by the softness and deformation of the coating layer.

There is no specific limitation on the coating resin used in the present invention. A coating resin that is usually used can be used therein. For example, chloroprene, chlorosulfonated olefin, silicone rubber, polyamide elastomer, poly(styrene butadiene), nitrile rubber, fluoro rubber, polyurethane, and the like, can be employed. Of these materials, a silicone composition having heat resistance, cold resistance and flame retardancy is preferred.

The silicone composition used in the present invention preferably contains a diorganopolysiloxane having a SiC-bonded vinyl group at a terminal unit. Such a diorganopolysiloxane is represented by the following general formula:

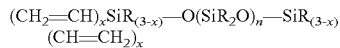

wherein R represents hydrocarbon groups preferably having 1 to 18 carbon atoms, R may be substituted with other atoms or functional groups, R may be of the same hydrocarbon groups or a mixture of different ones, x is 1, 2 or 3, preferably 1, and n is a numerical value necessary for the diorganopolysiloxane to have an average viscosity of 1,000 to 1,000,000 mPa·s at 25° C.

In order to make the logarithmic decrement 0.01 or more in the present invention, it is preferred that the organopolysiloxane mainly used as a composition component for forming a silicone coating layer have a viscosity of 1,000 mPa·s or more at 25° C. When the viscosity is less than 1,000 mPa·s, a silicone network structure increases after curing, and a coating film capable of absorbing an impact during deployment of the air bag cannot be obtained. Moreover, when the organopolysiloxane has a viscosity exceeding 1,000,000 mPa·s at 25° C., the logarithmic decrement exceeds 0.10. As a result, tucking properties are produced on the woven fabric surface, and the air bag sometimes shows poor deployment.

Preferred examples of the hydrocarbon group R include an alkyl group such as a methyl group, an ethyl group, an n-propyl group, an isopropyl group, a butyl group, an octyl group, a tetradecyl group or an octadecyl group, an alicyclic hydrocarbon group such as a cyclopentyl group, a cyclohexyl group or a methylcyclohexyl group, an aryl group such as a phenyl group, an alkaryl group such as a tolyl group and an aralkyl group such as a benzyl group or a phenylethyl group.

Preferred examples of the substituted hydrocarbon group include a halogenated group such as a 3,3,3-trifluoropropyl group, a 3-chloropropyl group or a chlorophenyl group. A cyanoalkyl group such as a cyanoethyl group may also be included. A group having an unsaturated aliphatic group such as a vinyl group, an allyl group, a hexenyl group or a cyclohexenyl group may also be included.

The hydrocarbon groups R are preferably ones each having 1 to 10 carbon atoms, more preferably at least 80% of the organic groups represented as R are methyl groups.

The above organopolysiloxane may be a group of the same copolymers. It may also be a mixture of different copolymers each having a polymerization degree equal to or different from the others. When the diorganopolysiloxane has diorganopolysiloxane units different from each other, the units may be randomly distributed or they may be distributed in blocks.

In the present invention, the coating film composed of a silicone composition is preferably composed of two coating layers. That is, a woven fabric surface is coated with a silicone composition as a first layer, and the first layer is coated with a silicone composition as a second layer.

The coating amount of the silicone composition in the first layer is preferably from 3 to 30 g/m². The composition is used for coating in order to maintain adhesion to the woven fabric before and after aging. The amount should preferably be as small as possible, as long as the bonding function of the coating is satisfactory, because restriction of the amount contributes to making the air bag light weight.

The silicone composition in the second layer is used for maintaining the silicone film elongation before and after aging, and contributes to maintaining an internal pressure retention during deployment of the air bag. The coating amount is preferably from 20 to 90 g/m², more preferably from 30 to 60 g/m². When the coating amount is in the above range, no air leakage takes place because no broken portion is produced in the coating film during deployment of the air bag. Moreover, because the hollow weave fabric has a suitable thickness, the air bag shows good foldability, and is excellent in storability.

In the two coating layers in the present invention, a coupling agent composed of an organosilicon compound is preferably added to improve the adhesive strength of the first layer silicone composition. The following compounds can be used as the coupling agent: a silane having a hydrolysable group; a compound having a vinyl group, an acryloxy group, a methacryloxy group, an epoxy group or an acid anhydride group that is bonded to the above silane through a carbon atom. A coupling agent having a molecular weight of 150 to 1,000 is usually used. A partially hydrolyzed product and/or a hydrolyzed product mixture of such a silane can also be used. Vinyltriacetoxysilane and γ-glycidoxypropyltrimethoxysilane, namely, mixture products of a silane represented by the following chemical formula (1) are preferably used.

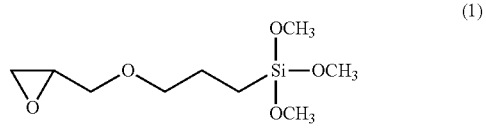 [SMILES: CO[Si](CCCOCC1CO1)(OC)OC]

(1)

More preferably, at least one compound represented by the chemical formula $(R_4O)_4Si$ (wherein R is a hydrocarbon group, the four Rs may be the same or different from each other, and R may be, for example, ethyl, propyl, vinylmethyl, cyclohexyl, or the like) is contained as the coupling agent.

One type of a coupling agent may be used. Alternatively, two types or more than two types of silanes in a mixture, or reaction products, or partially hydrolyzed products, or a partially hydrolyzed product mixture of the silanes in a mixture may also be used.

The coupling agent composed of an organosilicon compound is contained in the silicone composition in an amount of preferably 0.1 to 4.5% by weight, more preferably 0.5 to 3% by weight. When the amount is less than 0.1% by weight, a satisfactory adhesive strength of the coating exerted on the woven fabric surface cannot be obtained sometimes. Moreover, the adhesive strength sometimes becomes insufficient after wet heat aging and cooling-heating cycle aging. When the amount exceeds 4.5% by weight, bubbles are sometimes generated during heat treatment to worsen the product surface quality. As a result, the internal pressure retention of the air bag during deployment thereof sometimes becomes insufficient.

In the two coating layers in the present invention, the tensile elongation after curing of the silicone composition in the first silicone coating layer is 350% or less. The coupling agent that is composed of an organosilicon compound and that is added to improve the adhesion improves an adhesive strength exerted on the woven fabric surface, and at the same time lowers the tensile elongation of the silicone composition after curing.

In the two coating layers in the present invention, the diorganopolysiloxane having a SiC-bonded vinyl group at a terminal unit and contained in the silicone composition in the first silicone coating layer is mainly a diorganopolysiloxane represented by the following general formula:

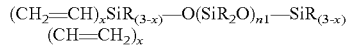

$(CH_2=CH)_x SiR_{(3-x)} - O(SiR_2O)_{n1} - SiR_{(3-x)}$
$(CH=CH_2)_x$ wherein R represents hydrocarbon groups preferably having 1 to 18 carbon atoms, R may be substituted with other atoms or functional groups, R may be of the same hydrocarbon groups or a mixture of different hydrocarbon groups, x is 1, 2 or 3, and n1 is a numerical value necessary for the diorganopolysiloxane to have an average viscosity of 1,000 to 100,000 mPa·s at 25° C.

The viscosity of the diorganopolysiloxane contained in the silicone composition used in the first layer is preferably from 5,000 to 100,000 mPa·s, more preferably from 5,000 to 30,000 mPa·s. The silicone composition in the first layer is used to improve the adhesion to the woven fabric. When the viscosity is 100,000 mPa·s or more, the silicone composition hardly permeate the woven fabric, and a desired adhesive strength cannot be obtained sometimes.

In the two coating layers in the present invention, the diorganopolysiloxane having a SiC-bonded vinyl group at a terminal unit and contained in the silicone composition in the second silicone coating layer is mainly a diorganopolysiloxane represented by the following general formula:

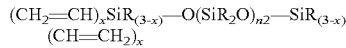

$(CH_2=CH)_x SiR_{(3-x)} - O(SiR_2O)_{n2} - SiR_{(3-x)}$
$(CH=CH_2)_x$ wherein R represents hydrocarbon groups preferably having 1 to 18 carbon atoms, R may be substituted with other atoms or functional groups, R may be of the same hydrocarbon groups or a mixture of different hydrocarbon groups, x is 1, 2 or 3, preferably 1, and n2 is a numerical value necessary for the diorganopolysiloxane to have an average viscosity of 50,000 to 1,000,000 mPa·s at 25° C.

The second silicone coating layer in the present invention performs the task of shielding an air leakage from the air bag. The deployment air bag is usually deployed on a very short time scale of 30 msec or less. The internal pressure during the deployment is 80 kPa or more, and a very large impact occurs on the coating film forming the air bag. When the silicone composition used in the second layer is inappropriate, the coating film is broken by the impact, causing air leakage, and thus the air bag cannot carry out its function.

In order to absorb the impact, and make the deployment excellent, namely, in order to make the logarithmic decrement fall in the range of 0.01 to 0.10, it is particularly preferred to make the average viscosity of the diorganopolysiloxane contained in the silicone composition used in the second layer fall in the range of 50,000 to 1,000,000 mPa·s. The tensile elongation of the silicone composition after curing obtained from the silicone composition that contains the diorganopolysiloxane having such an average viscosity is preferably 400% or more, more preferably 500 to 1,000%, most preferably 800% or less.

The best structure of the coating layers in the present invention comprises two silicone coating layers each having physical properties different from the others in the cross section of the film-forming layers on the woven fabric surface. Moreover, the coating layers may also be multi-layers exceeding two layers formed by further lamination.

An SPM (Scanning Probe Microscope) can clearly distinguish a difference in physical properties between a cross-linked and cured silicone in a film-forming state on a woven fabric surface and another crosslinked and cured silicone therein. When the cross section of a coating layer is measured in a tapping mode, a difference in elastic properties of the coating layer can be observed as a difference in a phase value. When the surface of a sample is tapped with a probe in the form of a cantilever while the probe is being controlled so that it is vibrated at a constant amplitude, the relationship between an applied vibration displacement and a vibration displacement of the probe tip is measured as a phase. A probe displacement on a hard surface is large, and as a result, the phase is observed to be large. When the phase is mapped, a phase image indicating an elasticity difference is obtained.

In the measurement of a cross section of the coating layer in the present invention, it is preferred that there be a distinct phase difference between the first layer and the second layer on the woven fabric surface, and that a phase image of two layers be obtained. A distinct phase difference between two layers signifies, for example, that there is a phase ratio of 1/1 to 1/2.5 in terms of an average phase ratio. Tapping conditions can be suitably selected so that an elasticity difference becomes outstanding. Hard tapping conditions are preferably employed. For example, an amplitude decrement under tapping conditions is from 15 to 40%, preferably about 35%.

Various types of probes can be used. For example, a probe that has a spring constant of 20 to 100 N/m, the tip of which is formed out of a silicon single crystal, and the tip portion of which has a radius of curvature of 10 to 20 mm can be used.

The average phase δ of the first layer and the average phase δ of the second layer from the woven fabric surface preferably have the following relationship:

(δ of first layer)>(δ of second layer)

In the present invention, it is more preferable that the ratio of the average phase be from 1.1 to 2.5. A layer structure in which a difference in physical properties is distinctly present makes the following compatible: the logarithmic decrement of the coating film is high; the coating film is hardly broken; and the coating film is well bonded to the woven fabric surface. As a result, functions of the air bag such as an internal pressure-retaining function can be maintained under various environmental conditions.

That is, the first layer is a hard layer, and the second layer is a soft layer. That the second layer is soft contributes to a large entire logarithmic decrement. Softness as a whole is necessary for retaining the air tightness for a long time. The first layer is a highly crosslinked silicone having relatively hard properties, and carries out the function of bonding the coating layer to the woven fabric.

It is more preferable that the ratio of the average phase δ be in the following relationship:

$$1.1<[(\delta \text{ of first layer})/(\delta \text{ of second layer})]<2.5$$

That is, the layer structure is as follows: the first layer is a hard layer, and the second layer is a soft layer, a difference in the physical properties between both layers being distinct. There is a large difference in physical properties between the first layer and the second layer; that the coating film is hardly broken and that the coating film is bonded well to the woven fabric surface are made highly compatible by making both layers perform their respective tasks.

Furthermore, it is preferred in the present invention that the ratio of an average film thickness D of the first layer to an average film thickness D of the second layer on the woven fabric surface be in the following relationship:

$$\frac{1}{30}<[(D \text{ of first layer})/(D \text{ of second layer})]<1$$

The presence of the second soft layer having a thickness equal to or greater than that of the first layer contributes to a large logarithmic decrement. The flexibility of the coating layer as a whole caused by the amount present of the second layer is effective in retaining the air tightness for a long time. Although it is satisfactory that the first layer be present in a minimum amount as a coating layer to carry out the function of bonding, a thickness of the first layer that ensures the uniform presence of the layer over the woven fabric surface is necessary.

In the present invention, the surface of the second silicone coating layer may be coated with a silicone coating composition as a third layer. Provision of the third layer makes the deployment speed of the air bag high. The silicone composition used for the third layer contains known inorganic fillers such as calcium carbonate, aluminum trihydrate, cabin black, diatomaceous earth, silica, talc and mica. The silicone composition becomes effective when the content of the inorganic filler is preferably 30% by weight or more, more preferably from 30 to 60% by weight. A coating amount of the third layer is preferably from 1 to 25 g/m², more preferably from 5 to 25 g/m². When the coating amount is 25 g/m² or less, making the third layer sufficiently light weight is achieved, and no dropout of the inorganic fillers occurs.

The hollow weave fabric for an air bag of the invention can retain adhesive strength (the retention being a measure of durability within an automobile) in wet heat aging (for 200 hr at 80° C. and 95% RH) and cooling-heating cycle aging (30 cycles of the following A to C:

A) treatment of the sample at 125° C. for 336 hr, and cooling the sample at a rate of 2° C./min;

B) treatment of the sample at −40° C. for 24 hr, and heating the sample at a rate of 2° C./min; and C) treatment of the sample at 85° C. and 95% RH for 24 hr, and heating the sample at rate of 2° C./min).

The sample having been subjected to the wet heat aging and the cooling-heating cycle aging shows no delamination after scrub testing (ISO 5981) 500 times or more.

The hollow weave fabric for an air bag of the present invention can be used for an air bag installed in the front portion of a driver's seat or an assistant driver's seat, and a curtain-like air bag that can correspond to the collision the vehicle encounters from the side or rollover of the vehicle. The hollow weave fabric can especially be used for a curtain-like air bag capable of retaining a pressurized gas for a given time.

There is no specific restriction on means for producing a woven fabric used for the hollow weave fabric for an air bag of the invention. The weaving machine should be an air-jet loom, a rapier loom, a projectile loom, a multi-phase weaving machine, or the like. A jacquard apparatus, a DOBBI apparatus, or the like apparatus can be used as a machine for controlling the up and down of a warp yarn. However, an electronic jacquard apparatus is advantageous in productivity, quickness in design alteration and preciseness of a design. Although there is no specific restriction on the number of feeders of a jacquard apparatus, an electronic jacquard apparatus having as many feeders as from 2,000 to 14,000 feeders is preferred, because such an apparatus can precisely correspond to designing a complicated shape.

In the present invention, the warp and weft dimensions or the smoothness of the woven fabric surface can be set in desired ranges by coating pretreatments such as a conventional scouring-setting step, a setting step alone or calendaring.

In the present invention, the silicone composition for the first layer with which the woven fabric surface is coated contains at least the following elements (a) to (d):

(a) an organopolysiloxane containing a SiC-bonded vinyl group at a terminal unit and having a viscosity of 1,000 to 100,000 mPa·s at 25° C.;

(b) an organopolysiloxane having at least 3 Si-bonded hydrogen atoms;

(c) a catalyst that promotes addition of Si-bonded hydrogen atoms to an aliphatic multiple bond; and (d) a coupling agent composed of an organosilicon compound.

The diorganopolysiloxane (a) containing a SiC-bonded vinyl group at a terminal unit is represented by the following general formula:

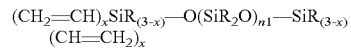

wherein R represents hydrocarbon groups preferably having 1 to 18 carbon atoms, R may be substituted with other atoms or functional groups, R may be of the same hydrocarbon groups or a mixture of different hydrocarbon groups, x is 1, 2 or 3, preferably 1, and n1 is a numerical value necessary for the diorganopolysiloxane to have an average viscosity of 5,000 to 100,000 mPa·s at 25° C.

The viscosity of the diorganopolysiloxane (a) is preferably from 5,000 to 50,000 mPa·s, more preferably from 5000 to 30,000 mPa·s. The silicone composition for the first layer is used to improve the adhesion to the woven fabric. When the viscosity exceeds 100,000 mPa·s, the silicone composition hardly permeates the woven fabric, and a desired adhesive strength cannot be obtained sometimes.

Preferred examples of the hydrocarbon group R include an alkyl group such as a methyl group, an ethyl group, an n-propyl group, an isopropyl group, a butyl group, an octyl group, a tetradecyl group or an octadecyl group, an alicyclic hydrocarbon group such as a cyclopentyl group, a cyclohexyl group or a methylcyclohexyl group, an aryl group such as a phenyl group, an alkaryl group such as a tolyl group and an aralkyl group such as a benzyl group or a phenylethyl group.

Preferred examples of the substituted hydrocarbon group include halogenated groups such as a 3,3,3-trifluoropropyl group, 3-chloroprpyl group or a chlorophenyl group. A cyanoalkyl group such as a cyanoethyl group may also be included. A group having an unsaturated aliphatic group such as a vinyl group, an allyl group, a hexenyl group or a cyclohexenyl group may also be included.

The hydrocarbon group R is preferably a hydrocarbon group having 1 to 10 carbon atoms, more preferably at least 80% of organic groups represented as R are methyl groups.

The above organopolysiloxane may be a group of the same copolymers. It may also be a mixture of different copolymers each having a polymerization degree equal to or different from those of the others. When the diorganopolysiloxane has diorganopolysiloxane units different from each other, the units may be randomly distributed or they may be distributed in blocks.

The organopolysiloxane having at least 3 Si-bonded hydrogen atoms is represented by the following general formula:

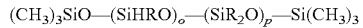

$(CH_3)_3SiO—(SiHRO)_o—(SiR_2O)_p—Si(CH_3)_3$ wherein R represents hydrocarbon groups preferably having 1 to 18 carbon atoms, R may be substituted with other atoms or functional groups, R may be of the same hydrocarbon groups or a mixture of different hydrocarbon groups, x is 1, 2 or 3, and o and p are present in a ratio of 1:0 to 1:2.0, preferably 1:0 to 1:7.

The total of o and p is 10 to 1,000, preferably from 20 to 200, more preferably from 30 to 100. For an organopolysiloxane having at least 3 Si-bonded hydrogen atoms per molecule, an organopolysiloxane having no Si valence saturated with a hydrogen atom and a siloxane oxygen atom is preferably saturated with a methyl group, an ethyl group or a phenyl group. However, the organopolysiloxane may contain all the groups described as R mentioned above.

Any known catalyst that promotes the reaction can be used as the catalyst for promoting addition of Si-bonded hydrogen atoms to an aliphatic multiple bond (c). Examples of such catalysts include finely divided metallic platinum (platinum sol), ruthenium, rhodium, palladium and iridium in which these metals may be supported on a solid carrier such as silicon dioxide, aluminum oxide or activated carbon, a ceramic material, an oxide mixture or a hydroxide mixture.

Compounds or complexes of these metals, such as platinum-olefin complexes, platinum-alcohol complexes such as Speyers Catalyst, platinum-alcoholate complexes, platinum-ether complexes, platinum-aldehyde complexes, platinum-ketone complexes including the reaction product of $H_2PtCl_6.6H_2O$ and cyclohexanone, platinum-vinylsiloxane complexes and in particular platinum-divinyltetramethyldisiloxane complexes with or without a detectable content of inorganically bonded halogen, bis(γ-picoline)-platinum dichloride, trimethylenepyridine platinum dichloride, dicyclopentadieneplatinum dichloride, dimethyl sulfoxide-ethyleneplatinum (II) dichloride and reaction products of platinum tetrachloride dissolved in 1-octene and sec-butylamine may also be used as the catalysts. Platinum compounds are particularly preferred catalysts.

The above catalysts can also be used singly or as a mixture. When a platinum catalyst is used, the catalyst can be used in an amount of 3 to 500 ppm as platinum based on the siloxane content, preferably 10 to 200 ppm based thereon.

Examples of the coupling agent composed of an organosilicon compound (d) include a silane having a hydrolysable group, or a silane having a vinyl, acryloxy, methacryloxy, epoxy or acid anhydride group bonded to a silicon atom of the silane through a carbon atom. Hydrolyzed products and/or a mixture of hydrolyzed products of such a silane can also be used. Vinyltriacetoxysilane and γ-glycidoxypropyltrimethoxysilane, namely, the reaction products of the silane represented by the above chemical formula (I) are preferably used.

One type of coupling agent can also be used. However, a mixture of two types or more than two types of silanes or reaction products of the silanes, or partially hydrolyzed products or a mixture of hydrolyzed products thereof can also be used. The tensile elongation after curing of the above silicone composition for the first layer is preferably 350% or less.

In the present invention, the silicone composition for the second layer with which the surface of the first layer is coated contains at least the following (A) to (C):

(A) an organopolysiloxane containing a Si—C bonded vinyl group at a terminal unit, and having a viscosity of 50,000 to 1,000,000 mPa·s at 25° C.;

(B) an organopolysiloxane having at least 3 Si-bonded hydrogen atoms; and (C) a catalyst for promoting addition of Si-bonded hydrogen atoms to aliphatic multiple bonds.

The diorganopolysiloxane having a SiC-bonded vinyl group at a terminal unit and contained in the silicone composition for the second layer (A) is a diorganopolysiloxane represented by the following general formula:

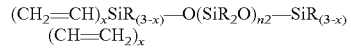

$(CH_2=CH)_xSiR_{(3-x)}—O(SiR_2O)_{n2}—SiR_{(3-x)}$
$(CH=CH_2)_x$ wherein R represents hydrocarbon groups preferably having 1 to 18 carbon atoms, R may be substituted with other atoms or functional groups, R may be of the same hydrocarbon groups or a mixture of different hydrocarbon groups, x is 1, 2 or 3, preferably 1, and n2 is a numerical value necessary for the diorganopolysiloxane to have an average viscosity of 50,000 to 1,000,000 mPa·s at 25° C.

The organopolysiloxane having at least 3 Si-bonded hydrogen atoms (B) and the catalyst for promoting addition of Si-bonded hydrogen atoms to aliphatic multiple bonds (C) may be similar to (b) and (c), respectively, contained in the silicone composition for the first layer.

The warp yarn density and the weft yarn density of the hollow weave fabric for an air bag of the present invention are preferably each from 40 to 100/2.54 cm. When the densities are each less than 40/2.54 cm, the air bag may burst during deployment thereof due to insufficient tenacity for a yarn of 500 dtex or less. When the densities each exceed 100/2.54 cm, a tenacity sufficient for an air bag deployment is obtained for a yarn of 150 dtex or more.

The system of the silicone composition used for the first layer of the two coating layers in the present invention may be any system such as a dope prepared by diluting the silicone composition with an organic solvent, a dope in which a silicone is emulsified and a dope without a solvent. Although there is no specific limitation thereon, preferably the system is a dope without a solvent. The composition is preferably applied with a floating knife, a roll-on-knife or dipping. When the silicone composition is applied, the coating is continuously heat treated at 120 to 200° C. for 10 to 600 sec to be cured by a crosslinking reaction of the silicone.

The system of the silicone composition used for the second layer in the present invention may be any system such as a dope prepared by diluting the silicone composition with an organic solvent, a dope in which silicone is emulsified and a dope without a solvent. Although there is no specific limitation thereon, preferably the system is a dope substantially without a solvent. The silicone composition is preferably applied with a floating knife, a roll-on-knife or a comma coater. When the silicone composition is applied, the coating is continuously heat treated at 120 to 200° C. for 10 to 600 sec to be cured by a crosslinking reaction of the silicone.

In the present invention, the silicone composition used for the third layer to decrease the surface friction has an average viscosity of 100 to 10,000 mPa·s or more at 25° C., and should contain an organopolysiloxane having a SiC-bonded vinyl group, an organopolysioxane having at least 3 Si-bonded hydrogen atoms, a catalyst for promoting addition of Si-bonded hydrogen atoms to aliphatic multiple bonds (hydrosilylation reaction), and 30% by weight or more of an inorganic filler.

Calcium carbonate, aluminum trihydrate, carbon black, diatomaceous earth, and the like, that are known can be used as the inorganic fillers. Although there is no specific limitation on the coating method, gravure coating can be preferably used.

In the present invention, the silicon composition may be allowed to contain known fillers for reinforcement. Examples of the fillers include silica, organosilicon resins, titania, quartz powder and aluminosilicate. Of these materials, silica and organosilicon resins are preferred. Fumed silica or precipitation silica can be used as the silica. The average particle size of the silica is from 0.1 to 20 μm, and the BET surface area is 50 m²/g or more. Moreover, a silicone resin represented by the general formula $(R_3SiO_{1/2})_a(R_3SiO_{3/2})_b$ can be employed as the organosilicon resin.

In addition, in the above general formula, R represents a methyl group, a phenyl group, a vinyl group or a hydrogen atom, and the ratio of a to b is selected so that the viscosity of silicone resin falls in the range of a viscosity of 30 to 300,000 mPa·s.

Furthermore, the silicone composition may be allowed to contain additives such as chain extenders, dyes, adhesion-promoting agents, coloring agents, pigments, viscosity-adjusting agents, bath life extenders, softening agents, curing inhibitors, flame retardants, anti-oxidation agents and catalyst-activating agents.

Figure 1:
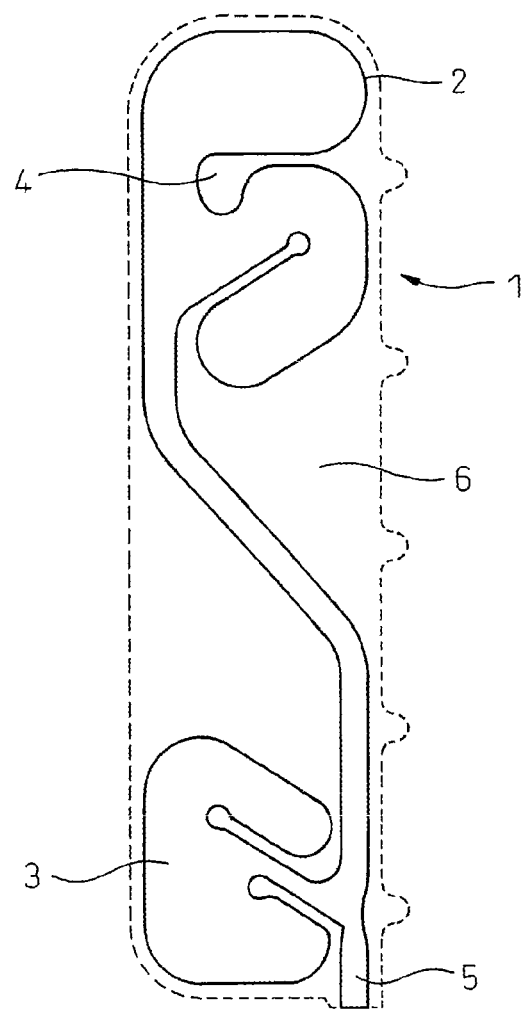
FIG. 1 is a schematic view of a base fabric for an air bag in examples.

DESCRIPTION OF REFERENCE NUMERALS 1 hollow weave fabric for an air bag
2 seam zone
3 double-layer hollow weave portion
4 single-layer portion
5 fluid inlet portion
6 partially knotted portion
F base woven fabric
G first layer
H second layer
S third layer (surface layer)

EXAMPLES

The present invention is further explained below by making reference to examples. In addition, measuring methods, evaluation methods, and the like, are as explained below.

(1) Total Size, Single Filament Size

Measurements are made in accordance with JIS L 1096.

(2) Weight of Bag Portion (Fabric Weight)

Measurements are made in accordance with JIS L 1096.

(3) Logarithmic Decrement

The logarithmic decrement is measured with a rigid pendulum type physical property tester (trade name of RPT-3000, manufactured by A and D Co., Ltd.). A small piece, 8×4 cm, cut out of a hollow weave fabric for an air bag is set on a measurement table so that the coating face is on the measurement blade side. A knife edge type RB200 frame of the blade specification is used, and the measurement conditions are as follows: measurement intervals of 6 sec; pendulum adsorption intervals (to make the pendulum stand still) of 2 sec; a pendulum period of 0.6 sec; heating rate of 10° C./min; and a temperature measurement range of −100 to 150° C. The logarithmic decrement is read at 20° C. in the measurement.

(4) Viscosity of a Silicone Composition

Measurements are made with a Brookfield viscometer (5) Elongation of the Resin after Curing a Silicone Composition Measurements are made in accordance with JIS K 6249

(6) Measurements with an SPM

A small piece is cut out from a hollow weave fabric for an air bag, and embedded in an epoxy resin. Cross-sectional sample is prepared using a cryo microtome so that a base fabric cross sections are obtained in the warp yarn direction and in the weft one.

(Conditions under which samples are prepared)

Ultramicrotome ULTRACUT N (trade name, manufactured by Reichert)

Cryo unit FC 4E (trade name, manufactured by Reichert)

Setting temperature: −130° C. for a sample; −130° C. for a glass knife

Next, a cross section of the base fabric is measured with an SPM (Scanning Probe Microscope).

Measurement apparatus: Nano Scope IV D3100 (trade name, manufactured by Digital Instruments)

Measurement mode: Tapping mode/resonance frequency of 276.6 kHz

Probe: NCH type silicone single crystal probe (Conditions under which measurements are made)

Scan angle: 0°

Scan rate: 0.3 Hz

Digital resolution (Number of sampling): 256×256

Control of amplitude level (Target amplitude): 1.6 V

Amplitude decrement: 31.25%

Integral gain: 0.65

Proportional gain: 1.5

It is confirmed that neither significant unevenness nor marked steps on the surface are present. A macroscopic inclination correction on the surface is made on the data, and phase mapping is carried out to give a phase image. Moreover, the average data of the phase is obtained.

Furthermore, the form of a similar cross-sectional sample is observed with an SEM.

FE-SEM S-4700 (trade name, manufactured by Hitachi, Ltd.

Acceleration voltage: 1 to 5 kV

Working distance: 12 to 13 mm (7) Compactness (Storability)

A hollow weave fabric for an air bag having a shape as shown in FIG. 1 is folded in a bellows-like manner in the direction from A to B with a width of 5.08 cm (2 inches). The folded airbag is then placed on a flat table. A glass plate, 50 mm×50 mm, is placed on the air bag near the central portion thereof, and a load is applied thereto with a 1 kg weight. The average thickness X (mm) is measured 30 minutes after applying the load.

(8) Internal Pressure Retention (Deployability), Maximum Pressure Reaching Time (Deployability)

A hollow weave fabric for an air bag having a shape as shown in FIG. 1 is folded in a bellows-like manner in the direction from A to B with a width of 5.08 cm (2 inches). A monofilament of 100 dtex is wound around the folded air bag at 10 cm intervals so that the folded air bag does not collapse. The hollow weave fabric for an air bag is connected to the tip of a tank having a capacity of 300 liters and an internal pressure of 900 kPa through a metal tube. An electromagnetic valve attached near the tip of the tank is instantaneously opened and closed. A variation in the internal pressure of the hollow weave fabric for an air bag is then examined with a pressure sensor attached to the tube on the side of the hollow weave fabric for an air bag.

When the internal pressure retention is 50% or more of the initial internal pressure after 8 sec, the air bag is accepted. The number of measurements is 10. When a minimum internal pressure retention does not exceed 50% even once, the air bag is considered as having a problem. Moreover, the deployability of the air bags is compared by the maximum pressure reaching time.

(9) Scrub Test

Measurements are made in accordance with ISO 5981.

The dimensions of the sample are 50 mm W (warp yarn direction)×100 mm L (weft yarn direction). A grip line is depicted in the weft yarn direction at two sites each 27 mm apart from one end of the sample.

Setting of the sample: the sample is placed so that the coating face is on the upper side; two gripping clamps are placed so that they face each other and the clamp edges coincide to the respective gripping lines, and made to grip the sample so that the central portion 46 mm long in the 100 mm L direction is situated between both clamps. The central portion 46 mm long is clearly folded, and a pressure load of 10 N is applied.

Establishment of testing criteria: visible delamination of the silicone layer is confirmed at every 100 cycles, and the number of cycles at which the delamination is produced is recorded. When no delamination is observed, the test is conducted until 2,000 cycles, and then completed.

(10) Wet Heat Aging

A hollow weave fabric for an air bag after coating was treated at 80° C. and 95% RH for 200 hr.

(11) Cooling-Heating Cycle Aging

A hollow weave fabric for an air bag after coating was treated for 30 cycles under the following conditions A to C:
A) the fabric is treated at 125° C. for 336 hr, and cooled at a rate of 2° C./min;
B) the fabric is treated at −40° C. for 24 hr, and heated at a rate of 2° C./min; and
C) the fabric is treated at 85° C. and 95% RH for 24 hr, and heated at a rate of 2° C./min.

Example 1

A nylon 66 fiber having a total size of 235 dtex and a single filament size of 3.3 dtex was used as a warp yarn and a weft yarn, and a gray fabric having a design as shown in FIG. 1 was prepared with an electronic jacquard apparatus and a rapier loom. The gray fabric was then scoured and set. The seam zone formed a reversible figured weave when seen from the bag portion side. A double-layer hollow weave portion was then prepared from two yarns. Moreover, a 2/2 basket weave pattern was formed as a single-layer portion out of 6 yarns.

Next, the fabric was coated with a liquid silicone composition in an amount of 50 g/m$^2$ on one side using a roll-on-knife coater, and heat treated at 180° C. for 1 minute in a drying machine. The fabric was similarly coated with a liquid silicone composition in an amount of 50 g/m$^2$ on the other side, and heat treated at 180° C. for 1 minute in a drying machine. The bag portion after coating had a warp yarn density of 72 ends/2.54 cm and a weft yarn density of 72 picks/2.54 cm.

An air bag was prepared from the hollow weave fabric for an air bag thus obtained. The properties of the air bag were as shown in Table 1. The air bag was excellent in compactness, and showed a good internal pressure retention, and a quick deployment speed.

The liquid silicone composition used herein was produced as explained below.

(1) Hexamethyldisilazane-treated silica in an amount of 11 parts by weight and 33 parts by weight of a vinyl-terminated polydimethylsiloxane having a viscosity of 150,000 mPa·s at 25° C. were mixed with a kneader. Next, 0.03 part by weight of ethynylcyclohexanol and 0.07 part by weight of a platinum-divinyltetramethyldisiloxane complex containing 1% by weight of platinum were added to the mixture with stirring.

(2) Hexamethyldisilazane-treated silica in an amount of 11 parts by weight and 33 parts by weight of a vinyl-terminated polydimethylsiloxane having a viscosity of 150,000 mPa·s at 25° C. were mixed with a kneader. A hydrogen siloxane in an amount of 8 parts by weight having a viscosity of about 1,000 mPa·s at 25° C. was further added to the mixture with stirring.

The mixture produced in (1) mentioned above in an amount of 44 parts by weight, 52 parts by weight of the mixture produced in (2) mentioned above, 1.5 parts by weight of an organopolysiloxane containing a Si—H bond and having a viscosity of about 20 mPa·s at 25° C., 0.9 part by weight of tetraethoxysilane and 0.9 part by weight of a platinum-divinyltetramethyldisiloxane complex containing 1% by weight of platinum were mixed with a kneader to give the liquid silicone composition.

Example 2

The fabric obtained in the same manner as in Example 1 was coated with a liquid silicone composition in an amount of 50 g/m$^2$ on one side using a roll-on-knife coater, and heat treated at 180° C. for 1 minute in a drying machine. The fabric was similarly coated with a liquid silicone composition in an amount of 50 g/m$^2$ on the other side, and heat treated at 180° C. for 1 minute in a drying machine. The bag portion after coating had a warp yarn density of 72 ends/2.54 cm and a weft yarn density of 72 picks/2.54 cm.

An air bag was prepared from the hollow weave fabric for an air bag thus obtained. The properties of the air bag were as shown in Table 1. The air bag was excellent in compactness, and showed good internal pressure retention, and quick deployment speed.

The liquid silicone composition used herein was produced as explained below.

(1) Hexamethyldisilazane-treated silica in an amount of 11 parts by weight and 33 parts by weight of a vinyl-terminated polydimethylsiloxane having a viscosity of 5,000 mPa·s at 25° C. were mixed with a kneader. Next, 0.03 part by weight of ethynylcyclohexanol and 0.07 part by weight of a platinum-divinyltetramethyldisiloxane complex containing 1% by weight of platinum were added to the mixture with stirring.

(2) Hexamethyldisilazane-treated silica in an amount of 11 parts by weight and 33 parts by weight of a vinyl-terminated polydimethylsiloxane having a viscosity of 5,000 mPa·s at 25° C. were mixed with a kneader. A hydrogen siloxane in an amount of 8 parts by weight having a viscosity of about 1,000 mPa·s at 25° C. was further added to the mixture with stirring.

The mixture produced in (1) mentioned above in an amount of 44 parts by weight, 52 parts by weight of the mixture produced in (2) mentioned above, 1.5 parts by weight of an organopolysiloxane containing a Si—H bond and having a viscosity of about 20 mPa·s at 25° C., 0.9 part by weight of tetraethoxysilane and 0.9 part by weight of a platinum-divinyltetramethyldisiloxane complex containing 1% by weight of platinum were mixed with a kneader to give the liquid silicone composition.

Comparative Example 1

The fabric obtained in the same manner as in Example 1 was coated with a liquid silicone composition in an amount of 50 g/m² on one side using a roll-on-knife coater, and heat treated at 180° C. for 1 minute in a drying machine. The fabric was similarly coated with a liquid silicone composition in an amount of 50 g/m² on the other side, and heat treated at 180° C. for 1 minute in a drying machine. The bag portion after coating had a warp yarn density of 72 ends/2.54 cm and a weft yarn density of 72 picks/2.54 cm.

An air bag was prepared from the hollow weave fabric for an air bag thus obtained. The properties of the air bag were as shown in Table 1. Although the air bag was good in compactness, it showed air leakage due to a low logarithmic decrement and a low internal pressure retention.

The liquid silicone composition used herein was produced as explained below.

(1) Hexamethyldisilazane-treated silica in an amount of 11 parts by weight and 33 parts by weight of a vinyl-terminated polydimethylsiloxane having a viscosity of 1,000 mPa·s at 25° C. were mixed with a kneader. Next, 0.03 part by weight of ethynylcyclohexanol and 0.07 part by weight of a platinum-divinyltetramethyldisiloxane complex containing 1% by weight of platinum were added to the mixture with stirring.

(2) Hexamethyldisilazane-treated silica in an amount of 11 parts by weight and 33 parts by weight of a vinyl-terminated polydimethylsiloxane having a viscosity of 1,000 mPa·s at 25° C. were mixed with a kneader. A hydrogen siloxane in an amount of 8 parts by weight having a viscosity of about 1,000 mPa·s at 25° C. was further added to the mixture with stirring.

The mixture produced in (1) mentioned above in an amount of 44 parts by weight, 52 parts by weight of the mixture produced in (2) mentioned above, 1.5 parts by weight of a hydrogen siloxane having a viscosity of about 20 mPa·s at 25° C., 0.9 part by weight of tetraethoxysilane and 0.9 part by weight of a platinum-divinyltetramethyldisiloxane complex containing 1% by weight of platinum were mixed with a kneader to give the liquid silicone composition.

Comparative Example 2

In the same manner as in Example 1, a fabric was coated with a liquid silicone composition in an amount of 150 g/m² on one side using a roll-on-knife coater, and heat treated at 180° C. for 1 minute in a drying machine. The fabric was similarly coated with a liquid silicone composition in an amount of 150 g/m² on the other side, and heat treated at 180° C. for 1 minute in a drying machine. The bag portion after coating had a warp yarn density of 72 ends/2.54 cm and a weft yarn density of 72 picks/2.54 cm.

An air bag was prepared from the hollow weave fabric for an air bag thus obtained. The properties of the air bag were as shown in Table 1. The air bag had tucking properties due to a large logarithmic decrement, and showed poor deployability.

In addition, the same liquid silicone composition as in Example 1 was used herein.

Example 3

A nylon 66 fiber having a total size of 175 dtex and a single filament size of 3.1 dtex was used as a warp yarn and a weft yarn, and a gray fabric having a design as shown in FIG. 1 was prepared with an electronic jacquard apparatus and a rapier loom. The gray fabric was then subjected to a set-coat step to give a double-layer hollow weave textured fabric having a warp yarn density of 166 ends/2.54 cm and a weft yarn density of 166/2.54 cm. The seam zone formed a reversible figured weave when seen from the bag portion side. A double-layer hollow weave portion was then prepared from two yarns. Moreover, a 2/2 basket weave pattern was formed as a single-layer portion out of 8 yarns.

Next, the fabric was coated with a liquid silicone composition in an amount of 35 g/m² on one side using a roll-on-knife coater, and heat treated at 180° C. for 1 minute in a drying machine. The fabric was similarly coated with a liquid silicone composition in an amount of 35 g/m² on the other side, and heat treated at 180° C. for 1 minute in a drying machine. The bag portion after coating had a warp yarn density of 83 ends/2.54 cm and a weft yarn density of 83 picks/2.54 cm.

An air bag was prepared from the hollow weave fabric for an air bag thus obtained. The properties of the air bag were as shown in Table 1. The air bag was excellent in compactness, and showed good internal pressure retention, and quick deployment speed.

In addition, the same liquid composition as in Example 1 was used.

Example 4

A nylon 66 fiber having a total size of 350 dtex and a single filament size of 4.9 dtex was used as a warp yarn and a weft yarn, and a gray fabric having a design as shown in FIG. 1 was prepared with an electronic jacquard apparatus and a rapier loom. The gray fabric was then scoured and set.

The seam zone formed a reversible figured weave when seen from the bag portion side. A double-layer hollow weave portion was then prepared from two yarns. Moreover, a 2/2 basket weave pattern was formed as a single-layer portion out of 6 yarns.

Next, the fabric was coated with a liquid silicone composition in an amount of 50 g/m² on one side using a roll-on-knife coater, and heat treated at 180° C. for 1 minute in a drying machine. The fabric was similarly coated with a liquid silicone composition in an amount of 50 g/m² on the other side, and heat treated at 180° C. for 1 minute in a drying machine. The bag portion after coating had a warp yarn density of 59 ends/2.54 cm and a weft yarn density of 59 picks/2.54 cm.

An air bag was prepared from the hollow weave fabric for an air bag thus obtained. The properties of the air bag were as shown in Table 1. The air bag was excellent in compactness, and showed good internal pressure retention, and quick deployment speed.

In addition, the same liquid silicone composition as in Example 1 was used herein.

Comparative Example 3

A nylon 66 fiber having a total size of 470 dtex and a single filament size of 6.6 dtex was used as a warp yarn and a weft yarn, and a gray fabric having a design as shown in FIG. 1 was prepared with an electronic jacquard apparatus and a rapier loom. The gray fabric was then scoured and set. The seam zone formed a reversible figured weave when seen from the bag portion side. A double-layer hollow weave portion was then prepared from two yarns. Moreover, a 2/2 basket weave pattern was formed as a single-layer portion out of 6 yarns.

Next, the fabric was coated with a liquid silicone composition in an amount of 130 g/m² on one side using a roll-on-knife coater, and heat treated at 180° C. for 1 minute in a drying machine. The fabric was similarly coated with a liquid silicone composition in an amount of 130 g/m² on the other side, and heat treated at 180° C. for 1 minute in a drying machine. The bag portion after coating had a warp yarn density of 59 ends/2.54 cm and a weft yarn density of 59 picks/2.54 cm.

An air bag was prepared from the hollow weave fabric for an air bag thus obtained. The properties of the air bag were as shown in Table 1. Because the air bag was heavy and the logarithmic decrement was high, the coating surface had tucking properties, and the air bag showed poor deployability.

In addition, the same liquid silicone composition as in Example 1 was used herein.

Example 5

A nylon 66 fiber having a total size of 175 dtex and a number of filaments of 56 was used as a warp yarn and a weft yarn, and a gray fabric having a design as shown in FIG. 1 was prepared with an electronic jacquard apparatus and a rapier loom. The gray fabric was then scoured and set. The seam zone formed a reversible figured weave when seen from the bag portion side. A double-layer hollow weave portion was then prepared from two yarns, and a 2/2 basket weave pattern was formed out of 4 yarns next thereto. A double-layer hollow weave portion was then formed out of 4 yarns next to the 2/2 basket weave pattern, and a 3/3 basket weave pattern was formed out of 6 yarns next to the double-layer hollow weave portion.

Next, the woven fabric was coated with a liquid silicone composition, as a first layer, in an amount of 20 g/m² on one side using a floating knife coater, and heat treated at 180° C. for 1 minute in a drying machine.

The liquid silicone composition used herein was produced as explained below.

(1) Hexamethyldisilazane-treated silica in an amount of 11 parts by weight and 33 parts by weight of a vinyl-terminated polydimethylsiloxane having a viscosity of 6,000 mPa·s at 25° C. were mixed with a kneader. Next, 0.03 part by weight of ethynylcyclohexanol and 0.07 part by weight of a platinum-divinyltetramethyldisiloxane complex containing 1% by weight of platinum were added to the mixture with stirring.

(2) Hexamethyldisilazane-treated silica in an amount of 11 parts by weight and 33 parts by weight of a vinyl-terminated polydimethylsiloxane having a viscosity of 6,000 mPa·s at 25° C. were mixed with a kneader. An organopolysiloxane in an amount of 8 parts by weight containing a Si—H bond and having a viscosity of about 1,000 mPa·s at 25° C. was further added to the mixture with stirring.

The mixture produced in (1) mentioned above in an amount of 44 parts by weight, 51 parts by weight of the mixture produced in (2) mentioned above, 1.5 parts by weight of an organopolysiloxane containing a Si—H bond and having a viscosity of about 20 mPa·s at 25° C., 2.0 parts by weight of tetraethoxysilane and 0.9 part by weight of a platinum-divinyltetramethyldisiloxane complex containing 1% by weight of platinum were mixed with a kneader to give the liquid silicone composition.

The first silicone coating layer surface was coated with a liquid silicone composition, as a second coating layer, in an amount of 60 g/m², and heat treated at 180° C. for 2 minutes in a drying machine.

The liquid silicone composition used herein was produced as explained below.

(3) Hexamethyldisilazane-treated silica in an amount of 11 parts by weight and 33 parts by weight of a vinyl-terminated polydimethylsiloxane having a viscosity of 100,000 mPa·s at 25° C. were mixed with a kneader. Next, 0.03 part by weight of ethynylcyclohexanol and 0.07 part by weight of a platinum-divinyltetramethyldisiloxane complex containing 1% by weight of platinum were added to the mixture with stirring.

(4) Hexamethyldisilazane-treated silica in an amount of 11 parts by weight and 33 parts by weight of a vinyl-terminated polydimethylsiloxane having a viscosity of 100,000 mPa·s at 25° C. were mixed with a kneader. An organopolysiloxane in an amount of 8 parts by weight containing a Si—H bond and having a viscosity of about 1,000 mPa·s at 25° C. was further added to the mixture with stirring.

The mixture produced in (3) mentioned above in an amount of 45 parts by weight, 52 parts by weight of the mixture produced in (4) mentioned above, 1.5 parts by weight of an organopolysiloxane containing a Si—H bond and having a viscosity of about 20 mPa·s at 25° C. and 0.9 part by weight of a platinum-divinyltetramethyldisiloxane complex containing 1% by weight of platinum were mixed with a kneader to give the liquid silicone composition.

Furthermore, the other side of the fabric was similarly coated with the liquid silicone composition used for the above first layer, and then with the liquid silicone composition used for the above second layer; the coated fabric was then heat treated in a drying machine. The bag portion after coating had a warp yarn density of 83 ends/2.54 cm and a weft yarn density of 83 picks/2.54 cm.

An air bag was prepared from the hollow weave fabric for an air bag thus obtained. The properties of the air bag were as shown in Table 2. The air bag was excellent in compactness, and showed good internal pressure retention.

Example 6

A nylon 66 fiber having a total size of 235 dtex and a number of filaments of 72 was used as a warp yarn and a weft yarn, and a gray fabric having a design as shown in FIG. 1 was prepared with an electronic jacquard apparatus and a rapier loom. The gray fabric was then scoured and set. The seam zone formed a reversible figured weave when seen from the bag portion side. A double-layer hollow weave portion was then prepared from two yarns, and a 2/2 basket weave pattern was formed out of 4 yarns next thereto. A double-layer hollow weave portion was then formed out of 4 yarns next to the 2/2 basket weave pattern, and a 3/3 basket weave pattern was formed out of 6 yarns next to the double-layer hollow weave portion.

Both sides of the hollow weave fabric were coated with the same silicone compositions as used in Example 5 in the same manner as therein. The bag portion after coating had a warp yarn density of 72 ends/2.54 cm and a weft yarn density of 72 picks/2.54 cm.

An air bag was prepared from the hollow weave fabric for an air bag thus obtained. The properties of the air bag were as shown in Table 2. The air bag was excellent in compactness, and showed good internal pressure retention.

Example 7

A nylon 66 fiber having a total size of 350 dtex and a number of filaments of 108 was used as a warp yarn and a weft yarn, and a gray fabric having a design as shown in FIG. 1 was prepared with an electronic jacquard apparatus and a rapier loom. The gray fabric was then scoured and set. The seam zone formed a reversible figured weave when seen from the bag portion side. A double-layer hollow weave portion was then prepared from two yarns, and a 2/2 basket weave pattern was formed out of 4 yarns next thereto. A double-layer hollow weave portion was then formed out of 4 yarns next to the 2/2 basket weave pattern, and a 3/3 basket weave pattern was formed out of 6 yarns next to the double-layer hollow weave portion.

Both sides of the hollow weave fabric were coated with the same silicone compositions as used in Example 5 in the same manner as therein. The bag portion after coating had a warp yarn density of 60 ends/2.54 cm and a weft yarn density of 60 picks/2.54 cm.

An air bag was prepared from the hollow weave fabric for an air bag thus obtained. The properties of the air bag were as shown in Table 2. The air bag was excellent in compactness, and showed good internal pressure retention.

Example 8

A nylon 66 fiber having a total size of 470 dtex and a number of filaments of 144 was used as a warp yarn and a weft yarn, and a gray fabric having a design as shown in FIG. 1 was prepared with an electronic jacquard apparatus and a rapier loom. The gray fabric was then scoured and set. The seam zone formed a reversible figured weave when seen from the bag portion side. A double-layer hollow weave portion was then prepared from two yarns, and a 2/2 basket weave pattern was formed out of 4 yarns next thereto. A double-layer hollow weave portion was then formed out of 4 yarns next to the 2/2 basket weave pattern, and a 3/3 basket weave pattern was formed out of 6 yarns next to the double-layer hollow weave portion.

Both sides of the hollow weave fabric were coated with the same silicone compositions as used in Example 5 in the same manner as therein. The bag portion after coating had a warp yarn density of 51 ends/2.54 cm and a weft yarn density of 51 picks/2.54 cm.

An air bag was prepared from the hollow weave fabric for an air bag thus obtained. The properties of the air bag were as shown in Table 2. The air bag was excellent in compactness, and showed good internal pressure retention.

Furthermore, a small piece sample was cut out from the hollow weave fabric for an air bag, and SPM measurements were made on the base fabric cross section. Two coating layers were observed from the phase image. The average phase ratio was 1.23, and a structure in which the elastic modulus of the second layer was low in comparison with that of the first layer could be confirmed. The average film thickness ratio was 0.30, the value being equivalent to the coating amount ratio.

Comparative Example 4

A nylon 66 fiber having a total size of 110 dtex and a number of filaments of 36 was used as a warp yarn and a weft yarn, and a gray fabric having a design as shown in FIG. 1 was prepared with an electronic jacquard apparatus and a rapier loom. The gray fabric was then scoured and set. The seam zone formed a reversible figured weave when seen from the bag portion side. A double-layer hollow weave portion was then prepared from two yarns, and a 2/2 basket weave pattern was formed out of 4 yarns next thereto. A double-layer hollow weave portion was then formed out of 4 yarns next to the 2/2 basket weave pattern, and a 3/3 basket weave pattern was formed out of 6 yarns next to the double-layer hollow weave portion.

Both sides of the hollow weave fabric were coated with the same silicone compositions as used in Example 5 in the same manner as therein. The bag portion after coating had a warp yarn density of 110 ends/2.54 cm and a weft yarn density of 110 picks/2.54 cm.

An air bag was prepared from the hollow weave fabric for an air bag thus obtained. The properties of the air bag were as shown in Table 2. Although the air bag is good in compactness, it burst during deployment. When the air bag was observed, it was seen that the weaving yarns were broken.

Comparative Example 5

A nylon 66 fiber having a total size of 700 dtex and a number of filaments of 108 was used as a warp yarn and a weft yarn, and a gray fabric having a design as shown in FIG. 1 was prepared with an electronic jacquard apparatus and a rapier loom. The gray fabric was then scoured and set. The seam zone formed a reversible figured weave when seen from the bag portion side. A double-layer hollow weave portion was then prepared from two yarns, and a 2/2 basket weave pattern was formed out of 4 yarns next thereto. A double-layer hollow weave portion was then formed out of 4 yarns next to the 2/2 basket weave pattern, and a 3/3 basket weave pattern was formed out of 6 yarns next to the double-layer hollow weave portion.

Both sides of the hollow weave fabric were coated with the same silicone compositions as used in Example 5 in the same manner as therein. The bag portion after coating had a warp yarn density of 38 ends/2.54 cm and a weft yarn density of 38 picks/2.54 cm.

An air bag was prepared from the hollow weave fabric for an air bag thus obtained. The properties of the air bag thus obtained were as shown in Table 2. Although the air bag did not burst during deployment, it showed poor compactness.

Example 9

A nylon 66 fiber having a total size of 470 dtex and a number of filaments of 144 was used as a warp yarn and a weft yarn, and a gray fabric having a design as shown in FIG. 1 was prepared with an electronic jacquard apparatus and a rapier loom. The gray fabric was then scoured and set. The seam zone formed a reversible figured weave when seen from the bag portion side. A double-layer hollow weave portion was then prepared from two yarns, and a 2/2 basket weave pattern was formed out of 4 yarns next thereto. A double-layer hollow weave portion was then formed out of 4 yarns next to the 2/2 basket weave pattern, and a 3/3 basket weave pattern was formed out of 6 yarns next to the double-layer hollow weave portion.

Next, the woven fabric was coated with a liquid silicone composition on one side, as a first layer, in an amount of 20 g/m$^2$ using a floating knife coater, and heat treated at 180° C. for 1 minute in a drying machine.

The liquid silicone composition used herein was produced as explained below.

(1) Hexamethyldisilazane-treated silica in an amount of 11 parts by weight and 33 parts by weight of a vinyl-terminated polydimethylsiloxane having a viscosity of 6,000 mPa·s at 25° C. were mixed with a kneader. Next, 0.03 part by weight of ethynylcyclohexanol and 0.07 part by weight of a platinum-divinyltetramethyldisiloxane complex containing 1% by weight of platinum were added to the mixture with stirring.

(2) Hexamethyldisilazane-treated silica in an amount of 11 parts by weight and 33 parts by weight of a vinyl-terminated polydimethylsiloxane having a viscosity of 6,000 mPa·s at 25° C. were mixed with a kneader. An organopolysiloxane in an amount of 8 parts by weight containing a Si—H bond and having a viscosity of about 1,000 mPa·s at 25° C. was further added to the mixture with stirring.

The mixture produced in (1) mentioned above in an amount of 46 parts by weight, 51 parts by weight of the mixture produced in (2) mentioned above, 1.5 parts by weight of a hydrogen siloxane having a viscosity of about 20 mPa·s at 25° C., 0.3 part by weight of 3-glycidoxypropyl-triethoxysilane and 0.9 part by weight of a platinum-divinyltetramethyldisiloxane complex containing 1% by weight of platinum were mixed with a kneader to give the liquid silicone composition.

The first silicone coating layer surface was coated with a liquid silicone composition, as a second coating layer, in an amount of 60 g/m$^2$ using a roll-on-knife coater, and heat treated at 180° C. for 2 minutes in a drying machine.

The liquid silicone composition used herein was produced as explained below.

(3) Hexamethyldisilazane-treated silica in an amount of 11 parts by weight and 33 parts by weight of a vinyl-terminated polydimethylsiloxane having a viscosity of 100,000 mPa·s at 25° C. were mixed with a kneader. Next, 0.03 part by weight of ethynylcyclohexanol and 0.07 part by weight of a platinum-divinyltetramethyldisiloxane complex containing 1% by weight of platinum were added to the mixture with stirring.

(4) Hexamethyldisilazane-treated silica in an amount of 11 parts by weight and 33 parts by weight of a vinyl-terminated polydimethylsiloxane having a viscosity of 100,000 mPa·s at 25° C. were mixed with a kneader. An organopolysiloxane in an amount of 8 parts by weight containing a Si—H bond and having a viscosity of about 1,000 mPa·s at 25° C. was further added to the mixture with stirring.

The mixture produced in (1) mentioned above in an amount of 45 parts by weight, 52 parts by weight of the mixture produced in (2) mentioned above, 1.5 parts by weight of a hydrogen siloxane having a viscosity of about 20 mPa·s at 25° C. and 0.9 part by weight of a platinum-divinyltetramethyldisiloxane complex containing 1% by weight of platinum were mixed with a kneader to give the liquid silicone composition.

Furthermore, the other side of the fabric was similarly coated with the liquid silicone composition used for the above first layer, and then with the liquid silicone composition used for the above second layer; the coated fabric was then heat treated in a drying machine. The bag portion after coating had a warp yarn density of 51 ends/2.54 cm and a weft yarn density of 51 picks/2.54 cm.

An air bag was prepared from the hollow weave fabric for an air bag thus obtained. The properties of the air bag were as shown in Table 3. The air bag after wet heat aging and cooling-heating cycle aging showed good scrub test results and good internal pressure retention.

Furthermore, a small piece sample was cut out from the hollow weave fabric for an air bag, and SPM measurements were made on the base fabric cross section. The results are shown in Table 3. Two coating layers were observed. A structure in which the elastic modulus of the second layer was low in comparison with that of the first layer could be confirmed. The average film thickness ratio was equivalent to the coating amount ratio.

Moreover, Table 3 also shows the results of SPM measurements in Examples 10 to 11 and Comparative Example 6 explained below.

Example 10

An air bag was prepared in the same manner as in Example 9, except that the silicone composition for the first layer was allowed to contain 1 part by weight of 3-glycidoxypropyltriethoxysilane. The properties of the air bag thus obtained were as shown in Table 3. The air bag after wet heat aging and cooling-heating cycle aging showed good scrub test results and good internal pressure retention.

Example 11

An air bag was prepared in the same manner as in Example 9, except that the silicone composition for the first layer was allowed to contain 3 parts by weight of 3-glycidoxypropyltriethoxysilane. The properties of the air bag thus obtained were as shown in Table 3. The air bag after wet heat aging and cooling-heating cycle aging showed good scrub test results and good internal pressure retention.

Comparative Example 6

An air bag was prepared in the same manner as in Example 9, except that 3-glycidoxypropyltriethoxysilane was not added to the silicone composition for the first layer, and that the coating amount of the second layer was made 160 g/m$^2$. The properties of the air bag thus obtained were as shown in Table 3. The air bag after wet heat aging and cooling-heating cycle aging showed poor scrub test results and insufficient internal pressure retention.

Comparative Example 7

An air bag was prepared in the same manner as in Example 9, except that the silicone composition for the first layer was allowed to contain 3 parts by weight of 3-glycidoxypropyl-triethoxysilane and that the coating amount of the second layer was made 160 g/m².

The properties of the air bag thus obtained are shown in Table 3. The air bag after wet heat aging and cooling-heating cycle aging showed scrub test results and an internal pressure retention that were satisfactory to a certain degree. However, the air bag was heavy, and showed poor compactness, as a result, had poor handling characteristics.

Comparative Example 8

An air bag was prepared in the same manner as in Example 9, except that the silicone composition for the first layer was allowed to contain 5 parts by weight of 3-glycidoxypropyl-triethoxysilane and that the coating amount of the second layer was made 160 g/m². However, many bubbles were generated on the coating surface during forming of the first coating layer.

The properties of the air bag thus obtained are shown in Table 3. The air bag after wet heat aging and cooling-heating cycle aging showed poor scrub test results and insufficient internal pressure retention.

Example 12

A nylon 66 fiber having a total size of 235 dtex and a number of filaments of 72 was used as a warp yarn and a weft yarn, and a gray fabric having a design as shown in FIG. 1 was prepared with an electronic jacquard apparatus and a rapier loom. The gray fabric was then scoured and set. The seam zone formed a reversible figured weave when seen from the bag portion side. A double-layer hollow weave portion was then prepared from two yarns, and a 2/2 basket weave pattern was formed out of 4 yarns next thereto. A double-layer hollow weave portion was then formed out of 4 yarns next to the 2/2 basket weave pattern, and a 3/3 basket weave pattern was formed out of 6 yarns next to the double-layer hollow weave portion.

Next, the woven fabric was coated with a liquid silicone composition on one side, as a first layer, in an amount of 5 g/m² using a floating knife coater, and heat treated at 180° C. for 1 minute in a drying machine.

The liquid silicone composition used herein was produced as explained below.

(1) Hexamethyldisilazane-treated silica in an amount of 11 parts by weight and 33 parts by weight of a vinyl-terminated polydimethylsiloxane having a viscosity of 6,000 mPa·s at 25° C. were mixed with a kneader. Next, 0.03 part by weight of ethynylcyclohexanol and 0.07 part by weight of a platinum-divinyltetramethyldisiloxane complex containing 1% by weight of platinum were added to the mixture with stirring.

(2) Hexamethyldisilazane-treated silica in an amount of 11 parts by weight and 33 parts by weight of a vinyl-terminated polydimethylsiloxane having a viscosity of 6,000 mPa·s at 25° C. were mixed with a kneader. An organopolysiloxane in an amount of 8 parts by weight containing a Si—H bond and having a viscosity of about 1,000 mPa·s at 25° C. was further added to the mixture with stirring.

The mixture produced in (1) mentioned above in an amount of 46 parts by weight, 51 parts by weight of the mixture produced in (2) mentioned above, 1.5 parts by weight of an organopolysiloxane containing a Si—H bond and having a viscosity of about 20 mPa·s at 25° C., 1.5 parts by weight of tetraethoxysilane and 0.9 part by weight of a platinum-divinyltetramethyldisiloxane complex containing 1% by weight of platinum were mixed with a kneader to give the liquid silicone composition.

The first silicone coating layer surface was coated with a liquid silicone composition, as a second coating layer, in an amount of 60 g/m² using a roll-on-knife coater, and heat treated at 180° C. for 2 minutes in a drying machine.

The liquid silicone composition used herein was produced as explained below.

(3) Hexamethyldisilazane-treated silica in an amount of 11 parts by weight and 33 parts by weight of a vinyl-terminated polydimethylsiloxane having a viscosity of 100,000 mPa·s at 25° C. were mixed with a kneader. Next, 0.03 part by weight of ethynylcyclohexanol and 0.07 part by weight of a platinum-divinyltetramethyldisiloxane complex containing 1% by weight of platinum were added to the mixture with stirring.

(4) Hexamethyldisilazane-treated silica in an amount of 11 parts by weight and 33 parts by weight of a vinyl-terminated polydimethylsiloxane having a viscosity of 100,000 mPa·s at 25° C. were mixed with a kneader. A hydrogen siloxane in an amount of 8 parts by weight having a viscosity of about 1,000 mPa·s at 25° C. was further added to the mixture with stirring.

The mixture produced in (1) mentioned above in an amount of 45 parts by weight, 52 parts by weight of the mixture produced in (2) mentioned above, 1.5 parts by weight of an organopolysiloxane containing a Si—H bond and having a viscosity of about 20 mPa·s at 25° C. and 0.9 part by weight of a platinum-divinyltetramethyldisiloxane complex containing 1% by weight of platinum were mixed with a kneader to give the liquid silicone composition.

Furthermore, the other side of the fabric was similarly coated with the liquid silicone composition used for the above first layer, and then with the liquid silicone composition used for the above second layer; the coated fabric was then heat treated in a drying machine. The bag portion after coating had a warp yarn density of 72 ends/2.54 cm and a weft yarn density of 72 picks/2.54 cm.

An air bag was prepared from the hollow weave fabric for an air bag thus obtained. The properties of the air bag were as shown in Table 4. The air bag after wet heat aging and cooling-heating cycle aging showed good scrub test results and good internal pressure retention.

Example 13

An air bag was prepared in the same manner as in Example 12, except that the coating amount of the first layer and that of the second layer were made 10 g/m² and 40 g/m², respectively.

The properties of the air bag thus obtained were as shown in Table 4. The air bag after wet heat aging and cooling-heating cycle aging showed good scrub test results and good internal pressure retention.

Example 14

An air bag was prepared in the same manner as in Example 12, except that the coating amount of the first layer and that of the second layer were made 10 g/m² and 80 g/m², respectively. The properties of the air bag thus obtained were as shown in Table 4. The air bag after wet heat aging and cooling-heating cycle aging showed good scrub test results and good internal pressure retention.

Comparative Example 9

An air bag was prepared in the same manner as in Example 12, except that the coating amount of the first layer and that of the second layer were made 10 g/m² and 220 g/m², respectively. The properties of the air bag thus obtained were as shown in Table 4. The air bag after wet heat aging and cooling-heating cycle aging showed good scrub test results and a good internal pressure retention. However, the air bag was heavy, had insufficient compactness, as a result, had poor handling characteristics.

Example 15

An air bag was prepared in the same manner as in Example 12, except that the coating amount of the first layer and that of the second layer were made 30 g/m² and 70 g/m², respectively. The properties of the air bag thus obtained were as shown in Table 4. The air bag after wet heat aging and cooling-heating cycle aging showed good scrub test results and good internal pressure retention.

Comparative Example 10

An air bag was prepared in the same manner as in Example 12, except that the coating amount of the first layer and that of the second layer were made 70 g/m² and 30 g/m², respectively. The properties of the air bag thus obtained were as shown in Table 4. The air bag after wet heat aging and cooling-heating cycle aging showed good scrub test results and good internal pressure retention. However, the air bag was heavy, had insufficient compactness, as a result, had poor handling characteristics.

Example 16

A nylon 66 fiber having a total size of 235 dtex and a number of filaments of 72 was used as a warp yarn and a weft yarn, and a gray fabric having a design as shown in FIG. 1 was prepared with an electronic jacquard apparatus and a rapier loom. The gray fabric was then scoured and set. The seam zone formed a reversible figured weave when seen from the bag portion side. A double-layer hollow weave portion was then prepared from two yarns, and a 2/2 basket weave pattern was formed out of 4 yarns next thereto. A double-layer hollow weave portion was then formed out of 4 yarns next to the 2/2 basket weave pattern, and a 3/3 basket weave pattern was formed out of 6 yarns next to the double-layer hollow weave portion.

Next, the fabric was coated in the same manner as in Example 5. The second silicone coating layer was then coated with a liquid silicone composition as a third layer in an amount of 10 g/m² using a gravure coater, and heat treated at 200° C. for 30 sec in a drying machine. The bag portion after coating had a warp yarn density of 72 ends/2.54 cm and a weft yarn density of 72 picks/2.54 cm.

The silicone composition used for the third layer was produced as explained below.

(1) Hexamethyldisilazane-treated silica in an amount of 11 parts by weight and 33 parts by weight of a vinyl-terminated polydimethylsiloxane having a viscosity of 500 mPa·s at 25° C. were mixed with a kneader. Next, 0.03 part by weight of ethynylcyclohexanol and 0.07 part by weight of a platinum-divinyltetramethyldisiloxane complex containing 1% by weight of platinum were added to the mixture with stirring.

(2) Hexamethyldisilazane-treated silica in an amount of 11 parts by weight and 33 parts by weight of a vinyl-terminated polydimethylsiloxane having a viscosity of 500 mPa·s at 25° C. were mixed with a kneader. An organopolysiloxane in an amount of 8 parts by weight containing a Si—H bond and having a viscosity of about 1,000 mPa·s at 25° C. was further added to the mixture with stirring.

The mixture produced in (1) mentioned above in an amount of 28 parts by weight, 30 parts by weight of the mixture produced in (2) mentioned above, 1 part by weight of a hydrogen siloxane having a viscosity of about 20 mPa·s at 25° C., 1 part by weight of an epoxysilane coupling agent, 0.5 part by weight of a platinum-divinyltetramethyldisiloxane complex containing 1% by weight of platinum, 20 parts by weight of calcium carbonate and 20 parts by weight of aluminum trihydrate were mixed with a kneader to give the liquid silicone composition.

An air bag was prepared from the hollow weave fabric for an air bag thus obtained. The properties of the air bag were as shown in Table 5. The air bag was excellent in compactness, and showed good internal pressure retention.

Example 17

A nylon 66 fiber having a total size of 350 dtex and a number of filaments of 108 was used as a warp yarn and a weft yarn, and a gray fabric having a design as shown in FIG. 1 was prepared with an electronic jacquard apparatus and a rapier loom. The gray fabric was then scoured and set. The seam zone formed a reversible figured weave when seen from the bag portion side. A double-layer hollow weave portion was then prepared from two yarns, and a 2/2 basket weave pattern was formed out of 4 yarns next thereto. A double-layer hollow weave portion was then formed out of 4 yarns next to the 2/2 basket weave pattern, and a 3/3 basket weave pattern was formed out of 6 yarns next to the double-layer hollow weave portion.

The fabric was then coated in the same manner as in Example 16. The bag portion after coating had a warp yarn density of 60 ends/2.54 cm and a weft yarn density of 60 picks/2.54 cm.

An air bag was prepared from the hollow weave fabric for an air bag thus obtained. The properties of the air bag were as shown in Table 5. The air bag was excellent in compactness, and showed good internal pressure retention.

Example 18

A nylon 66 fiber having a total size of 470 dtex and a number of filaments of 144 was used as a warp yarn and a weft yarn, and a gray fabric having a design as shown in FIG. 1 was prepared with an electronic jacquard apparatus and a rapier loom. The gray fabric was then scoured and set. The seam zone formed a reversible figured weave when seen from the bag portion side. A double-layer hollow weave portion was then prepared from two yarns, and a 2/2 basket weave pattern was formed out of 4 yarns next thereto. A double-layer hollow weave portion was then formed out of 4 yarns next to the 2/2 basket weave pattern, and a 3/3 basket weave pattern was formed out of 6 yarns next to the double-layer hollow weave portion.

The two silicone compositions for respective two coating layers used in Example 5 were similarly used. The woven fabric surface was coated with the silicone composition for the first coating layer, as a first coating layer, in an amount of 35 g/m² using a floating knife coater, and heat treated at 180° C. for 1 minute in a drying machine. The first silicone coating layer was coated with the liquid silicone composition for the second coating layer, as a second coating layer, in an amount of 85 g/m² using a roll-on-knife coater, and the woven fabric was heat treated at 180° C. for 2 minutes in a drying machine.

The second coating layer was coated with the liquid silicone composition used for the third coating layer in Example 16 in an amount of 10 g/m², as a third coating layer, using a gravure coater, and the coated fabric was heat treated at 200° C. for 30 second in a drying machine. The bag portion after coating had a warp yarn density of 57 ends/2.54 cm and a weft yarn density of 49 picks/2.54 cm.

An air bag was prepared from the hollow weave fabric for an air bag thus obtained. The properties of the air bag were as shown in Table 5. The air bag was excellent in compactness, and showed good internal pressure retention.

Furthermore, a small piece sample was cut out from the hollow weave fabric for an air bag, and SPM measurements were made on the base fabric cross section. The two coating layers and a surface coating layer to become the third layer were observed from the phase image. The distinct two layer structure is difficult to discern in the SEM photograph. The average phase of the first layer was 15.9, and that of the second layer was 9.6. The average phase ratio was 1.66. That is, it could be confirmed that, in the structure, the elastic modulus of the second layer was low in comparison with that of the first layer. The average film thickness ratio was 0.39, the value being approximately equivalent to the coating amount ratio.

Figure 2:
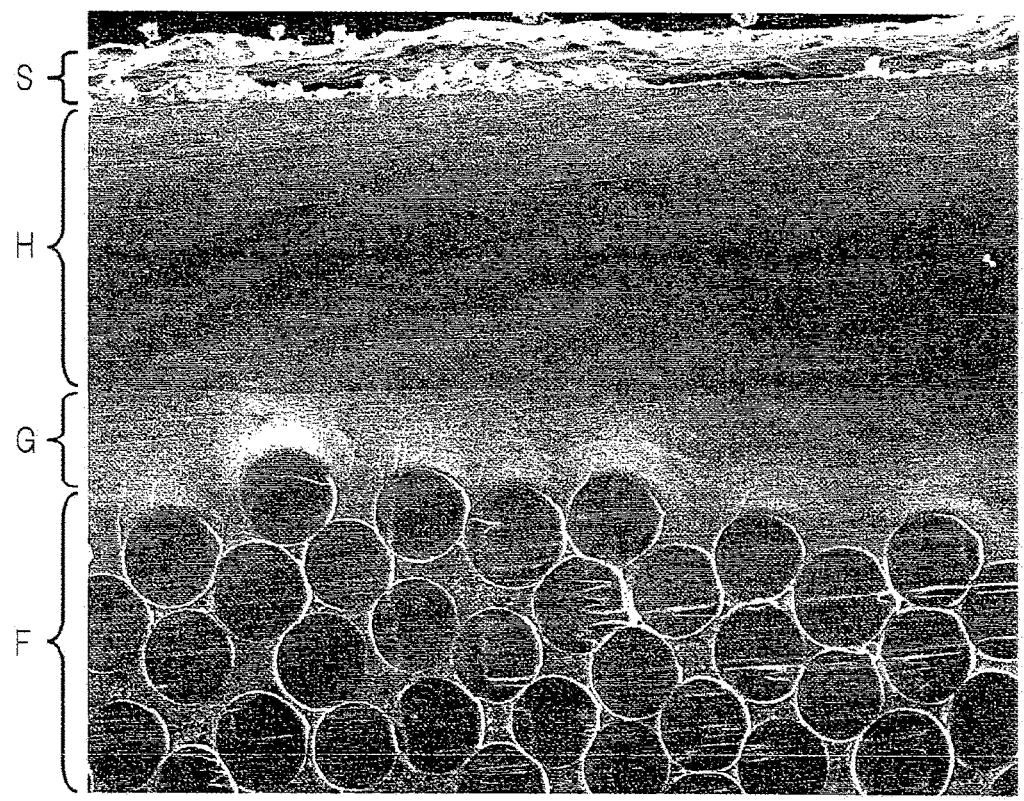
FIG. 2 is an SEM photograph of a cross section of a base fabric for an air bag in Example 18.
Figure 3:
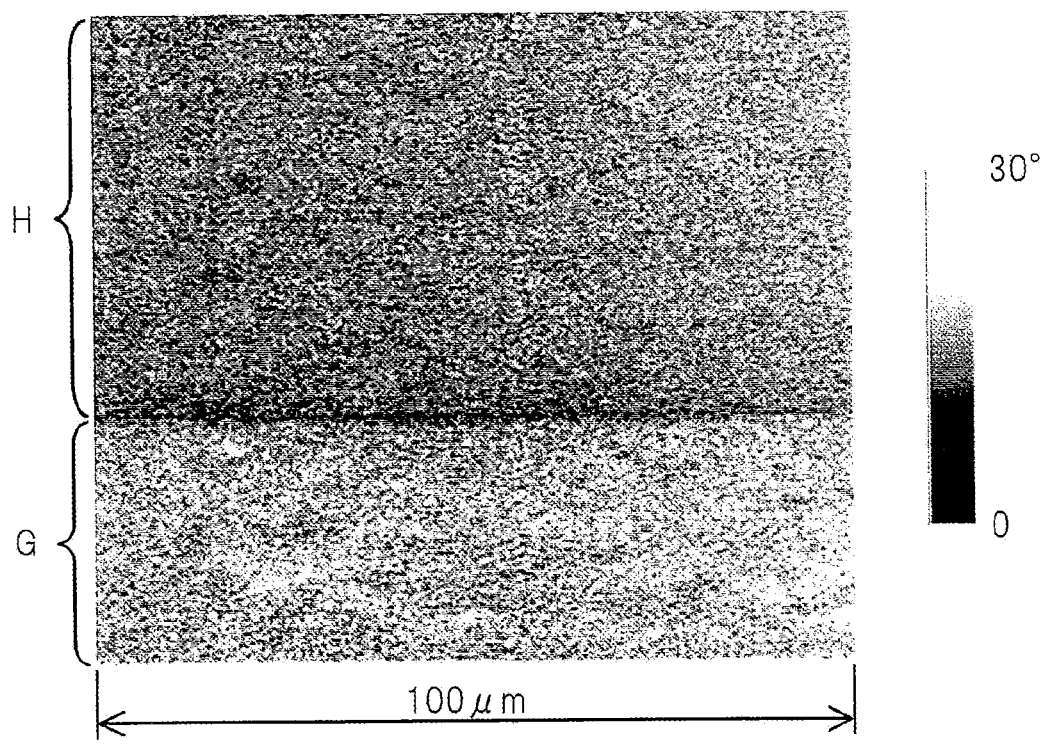
FIG. 3 is an SPM phase image of a cross section of a base fabric for an air bag in Example 18.

In addition, FIG. 2 shows an SEM photograph of a cross section of the base fabric for an air bag, and FIG. 3 shows an SPM phase image of a cross section of the base fabric for an air bag.

TABLE 1

|  | Ex. 1 | Ex. 2 | C. Ex. 1 | C. Ex. 2 | Ex. 3 | Ex. 4 | C. Ex. 3 |
|---|---|---|---|---|---|---|---|
| Total size of warp yarn (dtex) | 235 | 235 | 235 | 235 | 175 | 350 | 470 |
| Total size of weft yarn (dtex) | 235 | 235 | 235 | 235 | 175 | 350 | 470 |
| Warp yarn density (ends/2.54 cm) | 72 | 72 | 72 | 72 | 83 | 59 | 52 |
| Weft yarn density (picks/2.54 cm) | 72 | 72 | 72 | 72 | 83 | 59 | 52 |
| Weight of bag portion (g/m²) | 185 | 185 | 185 | 285 | 140 | 250 | 370 |
| Logarithmic decrement | 0.038 | 0.021 | 0.008 | 0.121 | 0.019 | 0.042 | 0.131 |
| Compactness (mm) | 48 | 50 | 47 | 65 | 40 | 53 | 85 |
| Maximum pressure reaching time (msec) | 150 | 140 | 160 | 260 | 120 | 165 | 310 |
| Internal pressure retention (average (%)) | 90 | 85 | 41 | 93 | 87 | 89 | 94 |
| Internal pressure retention (min.-max. (%)) | 87-94 | 81-89 | 35*-48* | 89-95 | 83-91 | 86-93 | 89-97 |

Note:
In addition, the mark * in the table indicates that the numerical value is at a level that causes a problem.

TABLE 2

|  | Ex. 5 | Ex. 6 | Ex. 7 | Ex. 8 | C. Ex. 4 | C. Ex. 5 |
|---|---|---|---|---|---|---|
| Total size of warp yarn (dtex) | 175 | 235 | 350 | 470 | 110 | 700 |
| Total size of weft yarn (dtex) | 175 | 235 | 350 | 470 | 110 | 700 |
| Warp yarn density (ends/2.54 cm) | 83 | 72 | 60 | 51 | 110 | 38 |
| Weft yarn density (picks/2.54 cm) | 83 | 72 | 60 | 51 | 110 | 38 |
| Weight of bag portion (g/m²) | 210 | 230 | 270 | 300 | 185 | 350 |
| Logarithmic decrement | 0.027 | 0.029 | 0.029 | 0.029 | 0.031 | 0.033 |
| Compactness (mm) | 53 | 57 | 60 | 62 | 46 | 72 |
| Internal pressure retention (average (%)) | 91 | 93 | 93 | 95 | Burst | 93 |

TABLE 2-continued

| | Ex. 5 | Ex. 6 | Ex. 7 | Ex. 8 | C. Ex. 4 | C. Ex. 5 |
|---|---|---|---|---|---|---|
| Internal pressure retention (min.-max. (%)) | 89-96 | 91-95 | 92-95 | 93-97 | Burst | 92-95 |

TABLE 3

| | Ex. 9 | Ex. 10 | Ex. 11 | C. Ex. 6 | C. Ex. 7 | C. Ex. 8 |
|---|---|---|---|---|---|---|
| Total size of warp yarn (dtex) | 470 | 470 | 470 | 470 | 470 | 470 |
| Total size of weft yarn (dtex) | 470 | 470 | 470 | 470 | 470 | 470 |
| Warp yarn density (ends/2.54 cm) | 51 | 51 | 51 | 51 | 51 | 51 |
| Weft yarn density (picks/2.54 cm) | 51 | 51 | 51 | 51 | 51 | 51 |
| Weight of bag portion (g/m$^2$) | 300 | 300 | 300 | 400* | 400* | 400* |
| Amount of coupling agent in first layer (wt. %) | 0.3 | 1.0 | 3.0 | 0 | 3.0 | 5.0 |
| Elongation of silicone resin in first layer (%) | 310 | 290 | 250 | 450 | 250 | 170 |
| Logarithmic decrement | 0.019 | 0.017 | 0.014 | 0.18 | 0.031 | 0.023 |
| Phase ratio (δ of first layer)/(δ of second layer) | 1.21 | 1.32 | 1.60 | 1.09 | — | — |
| Ratio of average film thickness | 0.30 | 0.30 | 0.30 | 0.11 | — | — |
| Compactness (mm) | 62 | 63 | 64 | 73* | 75* | 76* |
| Internal pressure retention (average (%)) | 90 | 93 | 93 | 96 | 95 | 43* |
| Internal pressure retention (min.-max. (%)) | 86-94 | 91-95 | 92-95 | 94-98 | 93-97 | 39*-48* |
| Internal pressure retention after wet heat aging (average (%)) | 89 | 93 | 93 | 35* | 93 | 38* |
| Internal pressure retention after wet heat aging (min.-max. (%)) | 85-93 | 91-95 | 92-95 | 20*-48* | 90-95 | 33*-45* |
| Internal pressure retention after cooling-heating cycle aging (average (%)) | 90 | 93 | 93 | 43* | 95 | 40* |
| Internal pressure retention after cooling-heating cycle aging (min.-max. %) | 89-94 | 91-95 | 92-95 | 35*-55* | 93-97 | 36*-45* |
| Scrub test (times) | 800 | 1200 | 2000 | 700 | 2000 | 200* |
| Scrub test after wet heat aging (times) | 700 | 1000 | 2000 | 50* | 2000 | 50* |
| Scrub test after cooling-heating cycle aging (times) | 800 | ≧1100 | 2000 | 150* | 2000 | 50* |

Note:
In addition, the mark * in the table indicates that the numerical value is at a level that causes a problem.

TABLE 4

| | Ex. 12 | Ex. 13 | Ex. 14 | C. Ex. 9 | Ex. 15 | C. Ex. 10 |
|---|---|---|---|---|---|---|
| Total size of warp yarn (dtex) | 235 | 235 | 235 | 235 | 235 | 235 |
| Total size of weft yarn (dtex) | 235 | 235 | 235 | 235 | 235 | 235 |
| Warp yarn density (ends/2.54 cm) | 72 | 72 | 72 | 72 | 72 | 72 |
| Weft yarn density (picks/2.54 cm) | 72 | 72 | 72 | 72 | 72 | 72 |
| Weight of bag portion (g/m$^2$) | 215 | 200 | 240 | 380* | 250 | 420* |

TABLE 4-continued

|  | Ex. 12 | Ex. 13 | Ex. 14 | C. Ex. 9 | Ex. 15 | C. Ex. 10 |
|---|---|---|---|---|---|---|
| Coating amount of first layer (g/m$^2$) | 5 | 10 | 10 | 10 | 70 | 70 |
| Coating amount of second layer (g/m$^2$) | 60 | 40 | 80 | 220 | 30 | 200 |
| Logarithmic decrement | 0.023 | 0.024 | 0.028 | 0.133 | 0.019 | 0.141 |
| Compactness (mm) | 54 | 55 | 58 | 73* | 59 | 78* |
| Internal pressure retention (average (%)) | 93 | 93 | 95 | 96 | 95 | 96 |
| Internal pressure retention (min.-max. (%)) | 90-95 | 91-95 | 94-97 | 94-98 | 93-97 | 94-98 |
| Internal pressure retention after wet heat aging (average (%)) | 92 | 93 | 94 | 96 | 88 | 96 |
| Internal pressure retention after wet heat aging (min.-max. (%)) | 89-94 | 91-95 | 92-95 | 94-98 | 83-91 | 94-98 |
| Internal pressure retention after cooling-heating cycle aging (average (%)) | 92 | 93 | 93 | 96 | 89 | 96 |
| Internal pressure retention after cooling-heating cycle aging (min.-max. %) | 89-94 | 91-95 | 92-95 | 94-98 | 85-93 | 94-98 |
| Scrub test (times) | 1200 | 2000 | 2000 | 500 | 1200 | 700 |
| Scrub test after wet heat aging (times) | 900 | 2000 | 2000 | 400* | 400* | 400* |
| Scrub test after cooling-heating cycle aging (times) | 1000 | 2000 | 2000 | 400* | 500 | 500 |

Note:
In addition, the mark * in the table indicates that the numerical value is at a level that causes a problem.

TABLE 5

|  | Ex. 16 | Ex. 17 | Ex. 18 |
|---|---|---|---|
| Total size of warp yarn (dtex) | 235 | 350 | 470 |
| Total size of weft yarn (dtex) | 235 | 350 | 470 |
| Warp yarn density (ends/2.54 cm) | 72 | 60 | 57 |
| Weft yarn density (picks/2.54 cm) | 72 | 60 | 49 |
| Weight of bag portion (g/m$^2$) | 240 | 280 | 370 |
| Logarithmic decrement | 0.023 | 0.021 | 0.015 |
| Compactness (mm) | 58 | 61 | 68 |
| Internal pressure retention (average %) | 93 | 93 | 94 |
| Internal pressure retention (min.-max. %) | 91-95 | 92-95 | 93-96 |

INDUSTRIAL APPLICABILITY

Use of the hollow weave fabric for an air bag of the present invention can provide a light weight air bag that retains its internal pressure, and that is rapidly deployed. The hollow weave fabric for an air bag of the present invention can be particularly appropriately used for a curtain-like air bag that protects the human body from the side face.

The invention claimed is:

1. A method for producing an air bag comprising a hollow weave fabric in which the periphery of a double-layer hollow weave portion is formed with a seam zone, wherein a warp yarn and a weft yarn forming the base fabric are each a poly (hexamethylene adipamide) fiber having a total size of 150 to 500 dtex, the double-layer hollow weave portion has a fabric weight of 120 to 350 g/m$^2$ on one side and a silicone coating layer formed of a silicone composition, the fabric shows a logarithmic decrement of 0.02 to 0.06 at 20° C. after the silicone coating layer is applied, and the air bag is capable of retaining 50% or more of an initial internal pressure 8 seconds after expansion and deployment when the initial internal pressure is a pressure obtained by inflating the air bag using a tank having a capacity of 300 liters and an internal pressure of 900 kPa, the method comprising:
coating the silicone coating layer on both outer sides of the double-layer hollow weave portion, for a coating amount of the silicone composition per outer side of from 35 to 50 g/m$^2$ as a solid component, wherein
the silicone coating layer consists of one coating layer, on each of the both outer sides of the double-layer portion,
the silicone coating layer is the only silicone coating layer coated thereon,
the silicone composition contains an organopolysiloxane with a SiC-bonded vinyl group at a terminal end,
the organopolysiloxane of the silicone coating layer has a viscosity of 5,000 to 150,000 mPa·s at 25° C., and
the silicone coating layer is formed with a floating knife or a roll-on-knife from a dope without a solvent.

2. A method for producing an air bag comprising a hollow weave fabric in which the periphery of a double-layer hollow weave portion is formed with a seam zone, wherein a warp yarn and a weft yarn forming the base fabric are each a poly (hexamethylene adipamide) fiber having a total size of 150 to 500 dtex, the double-layer hollow weave portion has a fabric weight of 120 to 350 g/m$^2$ on one side and a silicone coating layer formed of a silicone composition, the fabric shows a logarithmic decrement of 0.02 to 0.06 at 20° C. after the silicone coating layer is applied, and the air bag is capable of retaining 50% or more of an initial internal pressure 8 seconds after expansion and deployment, the method comprising:
coating the silicone coating layer on both outer sides of the double-layer hollow weave portion, for a coating amount of the silicone composition per outer side of from 35 to 50 g/m$^2$ as a solid component, such that the silicone composition permeates into the double-layer hollow weave portion, wherein the silicone coating layer consists of one coating layer,
on each of the both outer sides of the double-layer portion, the silicone coating layer is the only silicone coating layer coated thereon,
the silicone composition contains an organopolysiloxane with a SiC-bonded vinyl group at a terminal end,
the organopolysiloxane of the silicone coating layer has a viscosity of 5,000 or more and less than 100,000 mPa·s at 25° C., and
the silicone coating layer is formed with a floating knife or a roll-on-knife from a dope without a solvent.

* * * * *

UNITED STATES PATENT AND TRADEMARK OFFICE
CERTIFICATE OF CORRECTION

| | |
|---|---|
| PATENT NO. | : 9,751,486 B2 |
| APPLICATION NO. | : 14/245073 |
| DATED | : September 5, 2017 |
| INVENTOR(S) | : Toshiro Nagaoka |

It is certified that error appears in the above-identified patent and that said Letters Patent is hereby corrected as shown below:

On the Title Page

Item [72] (Inventor), Line 10:
Delete "Toshihiro" and insert -- Toshiro --, therefore.

Signed and Sealed this
Twenty-first Day of November, 2017

Joseph Matal
*Performing the Functions and Duties of the*
*Under Secretary of Commerce for Intellectual Property and*
*Director of the United States Patent and Trademark Office*